US006945657B2

(12) United States Patent
Shirai et al.

(10) Patent No.: US 6,945,657 B2
(45) Date of Patent: Sep. 20, 2005

(54) SURVEYING INSTRUMENT

(75) Inventors: Masami Shirai, Saitama (JP); Shunichiro Wakamiya, Saitama (JP); Homu Takayama, Saitama (JP); Kenji Kaneko, Saitama (JP)

(73) Assignee: PENTAX Corporation, Tokyo (JP)

( * ) Notice: Subject to any disclaimer, the term of this patent is extended or adjusted under 35 U.S.C. 154(b) by 248 days.

(21) Appl. No.: 09/978,542

(22) Filed: Oct. 18, 2001

(65) Prior Publication Data

US 2002/0051288 A1 May 2, 2002

(30) Foreign Application Priority Data

Oct. 19, 2000 (JP) ....................................... 2000-319117

(51) Int. Cl.[7] ............................ G02B 5/08; G02B 27/00
(52) U.S. Cl. ....................... 359/608; 359/601; 359/613; 359/831
(58) Field of Search ................................ 359/601–614, 359/399–432, 831–837, 362–363, 738; 396/373–386, 101–148

(56) References Cited

U.S. PATENT DOCUMENTS 4,332,446 A * 6/1982 Okuno ....................... 396/281
5,095,326 A * 3/1992 Nozaki et al. .............. 396/384
5,233,475 A * 8/1993 Ohshita ....................... 359/836
5,668,674 A * 9/1997 Kanai et al. ................ 359/835
5,796,517 A * 8/1998 Sensui et al. ............... 359/426
5,838,504 A * 11/1998 Ichikawa et al. ........... 359/834
5,877,892 A * 3/1999 Nakamura et al. .......... 359/426
6,175,455 B1 * 1/2001 Kato et al. .................. 359/837
6,331,918 B1 12/2001 Shirai ......................... 359/698
6,377,409 B2 * 4/2002 Kanai ......................... 359/834

FOREIGN PATENT DOCUMENTS

| | | | | |
|---|---|---|---|---|
| JP | 59-83103 | * | 5/1984 | ................. 359/431 |
| JP | 2-77001 | * | 3/1990 | ................. 359/431 |
| JP | 10-39121 | * | 2/1998 | ................. 359/431 |
| JP | 10-73772 | | 3/1998 | |
| JP | 2000-97700 | | 4/2000 | |

* cited by examiner

*Primary Examiner*—Thong Q Nguyen
(74) *Attorney, Agent, or Firm*—Greenblum & Bernstein, P.L.C.

(57) ABSTRACT

A surveying instrument includes a sighting telescope having an objective lens and an eyepiece; an erecting optical system functioning so that an image formed by said objective lens is viewed as an erect image through the eyepiece; and a light shield device, positioned in an optical path extending from an incident surface of the erecting optical system to an exit surface of the erecting optical system, for preventing an off-field light bundle which is incident on the erecting optical system from reaching the eyepiece.

8 Claims, 20 Drawing Sheets

SURVEYING INSTRUMENT

BACKGROUND OF THE INVENTION

1. Field of the Invention

The present invention relates to a surveying instrument having a sighting telescope, and more specifically relates to a surveying instrument having a sighting telescope which is equipped with a device for preventing a ghost image from being formed in the field of view of the sighting telescope.

2. Description of the Related Art

A conventional surveying instrument such as a total station has a function to measure the distance between two points and also horizontal and vertical angles. Such a conventional surveying instrument generally measures the distance between two points with an electronic distance meter (EDM) incorporated in or attached to the surveying instrument. The electronic distance meter incorporates an optical distance meter which calculates the distance via the phase difference between projecting light and reflected light and via the initial phase of internal reference light, or via the time difference between the projecting light and the reflected light. The optical distance meter includes a light-transmitting optical system for transmitting a measuring light (projecting light) to the target (sighting object) via the objective lens of a sighting telescope (collimating telescope) provided as a component of the electronic distance meter, and a light-receiving optical system for receiving light (reflected light) reflected by the target.

Among conventional surveying instruments having such an electronic distance meter, a surveying instrument whose electronic distance meter employs a prism having a dichroic mirror (wavelength selection mirror) that serves as a beam-splitting optical system is known in the art. Such a prism having a dichroic mirror is hereinafter referred to as a "dichroic prism". The dichroic mirror reflects light with specific wavelengths while allowing light with other wavelengths to pass through. The dichroic prism is disposed between the objective lens and the eyepiece of the sighting telescope so that the measuring light, which is emitted by a light emitting element, is reflected by the dichroic mirror of the dichroic prism to be projected toward the target (sighting object) via the objective lens of the sighting telescope. The light which is reflected by the target and passed through the objective lens is selectively reflected by the dichroic mirror to travel to a light-receiving element.

On the other hand, advancements have been made in the development of surveying instruments provided with a sighting telescope having an autofocus system, wherein a phase-difference detection autofocus system is widely used. With this system, an in-focus state is detected based on the correlation between two images formed by two light bundles which are respectively passed through two different pupil areas of an objective lens of the sighting telescope.

The applicants of the present invention have proposed a surveying instrument in Japanese laid-open publication No. 10-73772 (U.S. Pat. No. 5,877,892), in which one of the first through fourth reflection surfaces of a Porro prism is formed as a semitransparent mirror to divide the incident light path into two optical paths: a first optical path for the phase-difference detection autofocus system, and a second optical path for the sighting telescope.

However, in the above described conventional surveying instruments having a sighting telescope, especially with a Porro prism, a ghost image (or a flare spot), which is caused by off-field light (non-image forming light), is seen through the eyepiece of the sighting telescope. If such off-field light enters the autofocus system via the aforementioned semi-transparent mirror, the performance of the autofocus system deteriorates.

SUMMARY OF THE INVENTION

An object of the present invention is to provide a a surveying instrument, wherein the performance of each of the sighting telescope and the focus detecting device of the surveying instrument is fully utilized by preventing a ghost image from being formed in the field of the sighting telescope optical system.

To achieve the object mentioned above, according to an aspect of the present invention, a surveying instrument is provided, including a sighting telescope having an objective lens and an eyepiece; an erecting optical system functioning so that an image formed by the objective lens is viewed as an erect image through the eyepiece; and a light shield device, positioned in an optical path extending from an incident surface of the erecting optical system to an exit surface of the erecting optical system, for preventing an off-field light bundle which is incident on the erecting optical system from reaching the eyepiece.

In an embodiment, the light shield device includes a light shield mask or plate fixed to the incident surface of the erecting optical system.

In an embodiment, the light shield mask includes an aperture which allows image forming light to pass therethrough, the aperture being shaped so as to be asymmetrical with respect to an optical axis incident on the incident surface of the erecting optical system.

In an embodiment, a first length of the aperture from the incident optical axis to a first side, at which an optical path length between the incident surface and a first reflection surface of the erecting optical system is shortest, is shorter than a second length of the aperture from the incident optical axis to a second side at which an optical path length between the incident surface and the first reflection surface is longest.

In an embodiment, the erecting optical system includes two cemented prisms, and wherein the light shield device includes a recessed portion formed on a common edge of the cemented surface of the two cemented prisms.

In an embodiment, the erecting optical system includes two cemented prisms, and wherein the light shield device includes a beveled surface formed on a common edge of the cemented surface of the two cemented prisms.

In an embodiment, the light shield device is formed by an extended portion of the erecting optical system on the incident surface thereof, the extended portion being deformed to extend toward the objective lens side so that the off-field light bundle which is reflected by a first reflection surface of the erecting optical system is prevented from being incident on a second reflection surface of the erecting optical system and being allowed to exit from the erecting optical system via the extended portion.

In an embodiment, the erecting optical system includes a semitransparent film formed on a first reflection surface of the erecting optical system, wherein light incident on the first reflection surface is transmitted through the semitransparent film to proceed toward a focus detecting device which detects a focus state of the sighting telescope.

The erecting optical system can include a Porro prism or a roof prism.

According to another aspect of the present invention, a surveying instrument is provided, including a sighting telescope having an objective lens and an eyepiece; a semitransparent film positioned between the objective lens and the eyepiece; a focus detecting device which receives light which is passed through the semitransparent film to detect a focus state of the sighting telescope; and a light shield device, positioned in an optical path extending from the semitransparent film to the focus detecting device, for preventing an off-field light bundle which is incident on the semitransparent film from reaching the focus detecting device.

In an embodiment, the surveying instrument further includes an erecting optical system functioning so that an image formed by the objective lens is viewed as an erect image through the eyepiece, the semitransparent film being formed on a reflection surface of the erecting optical system.

In an embodiment, the light shield device is a light shield mask fixed to an incident surface of the erecting optical system.

In an embodiment, the surveying instrument further includes a beam splitting prism which is provided separately from the erecting optical system and cemented to the semitransparent film, the light shield device being fixed to the beam splitting prism.

In an embodiment, the semitransparent film is formed on a first reflection surface of the erecting optical system, the beam splitting prism being cemented to the first reflection surface wherein the semitransparent film being positioned between the beam splitting prism and the first reflection surface.

In an embodiment, the semitransparent film is formed on a second reflection surface of the erecting optical system, the beam splitting prism being cemented to the second reflection surface wherein the semitransparent film being positioned between the beam splitting prism and the second reflection surface.

In an embodiment, the surveying instrument includes an erecting optical system functioning so that an image formed by the objective lens is viewed as an erect image through the eyepiece, and a beam splitting prism provided separately from the erecting optical system; wherein the semitransparent film is formed on the beam splitting prism.

In an embodiment, the light shield device is fixed to an exit surface of the beam splitting prism.

The focus detecting device can be a phase-difference detection focus detecting device or a contrast detecting focus detecting device.

The erecting optical system can include a Porro prism or a roof prism.

Preferably, the sighting telescope includes a focus adjustment lens positioned between the objective lens and the erecting optical system.

Preferably, the beam splitting prism includes a right-angle prism.

Preferably, the Porro prism includes three right angle prisms.

BRIEF DESCRIPTION OF THE DRAWINGS

The present invention will be described below in detail with reference to the accompanying drawings in which.

DESCRIPTION OF THE PREFERRED EMBODIMENTS

Figure 1:
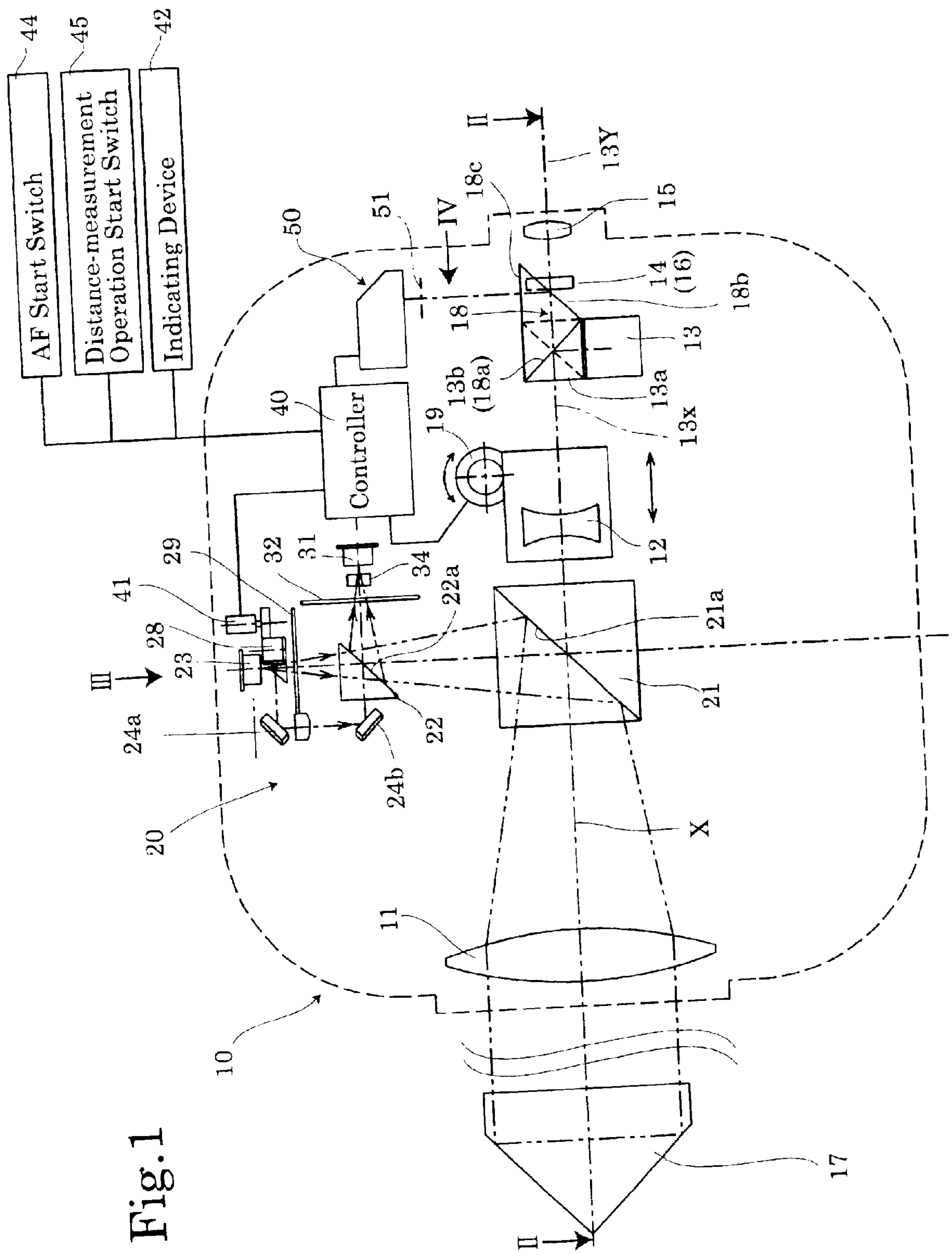
FIG. 1 is a schematic drawing of an embodiment of an electronic distance meter having an focus detecting device, according to the present invention.
Figure 2:
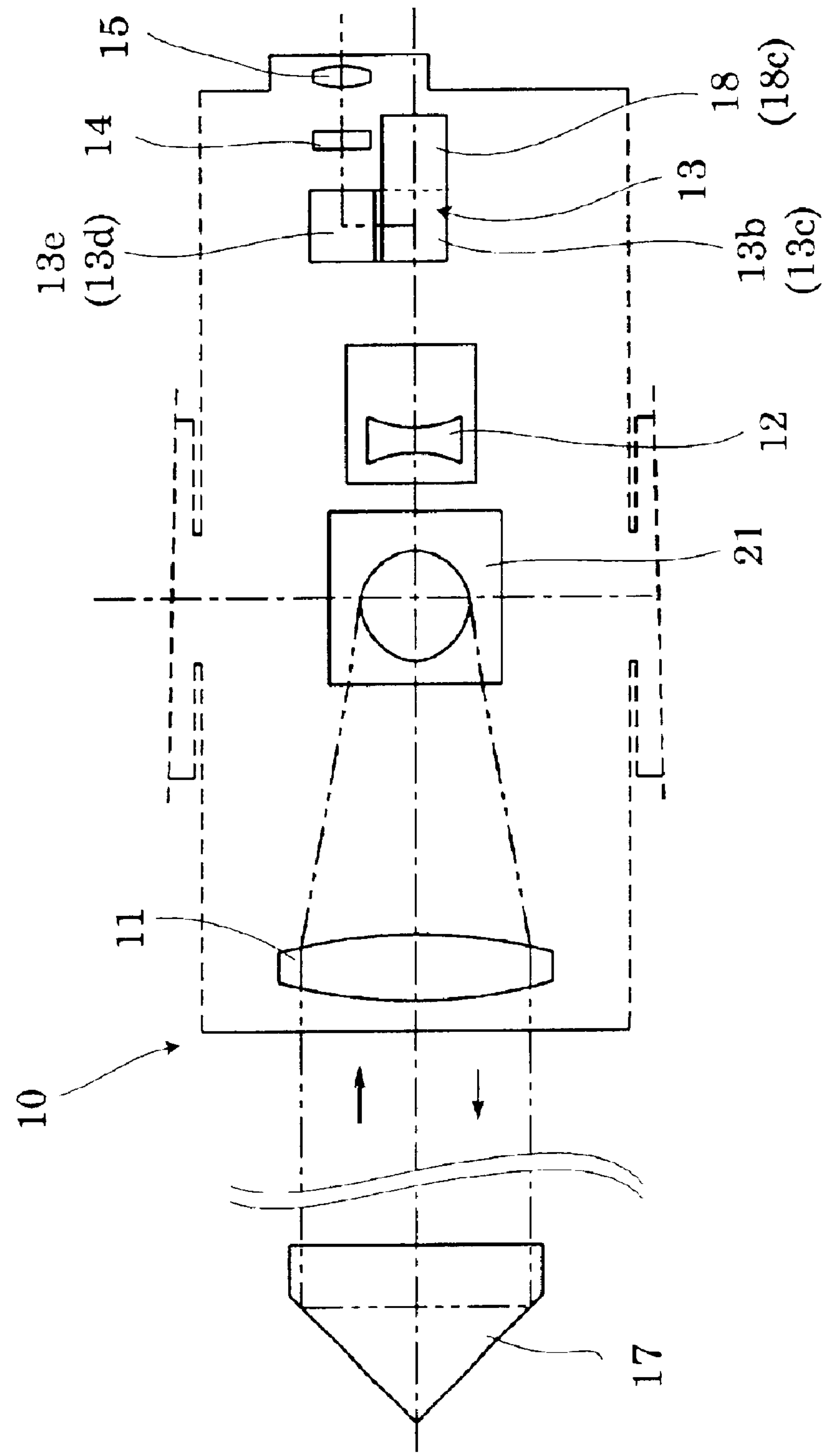
FIG. 2 is a cross sectional view of fundamental optical elements of the electronic distance meter shown in FIG. 1, taken along II—II line in FIG. 1, viewed in the direction of the appended arrows.

FIG. 1 shows an embodiment of an electronic distance meter (EDM) equipped with an autofocus system, according to the present invention. This electronic distance meter can be incorporated in or attached to a surveying instrument such as a total station. The electronic distance meter is provided with a sighting telescope (sighting telescope optical system) 10 and an optical distance meter 20. As shown in FIGS. 1 and 2, the sighting telescope 10 is provided with an objective lens 11, a focusing lens 12, a Porro prism (erecting optical system) 13, a focal-plane plate (reticle plate) 14, and an eyepiece 15, in that order from the object side (i.e., left to right as shown in FIG. 1). The focal-plane plate 14 is provided thereon with a reticle (cross hair) 16. The focusing lens 12 is guided in the direction of an optical axis X of the sighting telescope 10. The image of a corner cube prism (i.e., a sighting object placed at a point of measurement) 17 that is formed through the objective lens 11 can be precisely focused on the front surface (the surface facing the objective lens 11) of the focal-plane plate 14 by adjusting the axial position of the focusing lens 12 in accordance with the distance of the corner cube prism 17 with respect to the sighting telescope 10. The Porro prism 13 functions so that the image of the corner cube prism 17 is viewed as an erect image through the eyepiece 15. The user (surveyor) of the surveying instrument sights a magnified image of the corner cube prism 17, which is focused on the focal-plane plate 14, via the eyepiece 15.

The electronic distance meter is provided between the objective lens 11 and the focusing lens 12 with a cubic dichroic prism 21 that serves as a beam-splitting optical system. The dichroic prism 21 is constructed from two right-angle prisms which are cemented to each other. The dichroic prism 21 is provided with a dichroic mirror **21*a* (wavelength selection mirror) which is formed on a boundary surface between the two right-angle prisms. The dichroic prism 21 is an element of the optical distance meter 20, and is fixedly positioned behind the objective lens 11 via a fixing device (not shown). The dichroic prism 21 is provided therein with the aforementioned dichroic mirror 21*a* which reflects light with specific wavelengths while allowing others to pass therethrough. The dichroic prism 21 is positioned on the optical axis X so that the dichroic mirror 21*a*** is inclined to a plane perpendicular to the optical axis X by 45 degrees.

The optical distance meter 20 is provided above the dichroic prism 21, in FIG. 1, with a light-emitting element (laser diode) 23. The light-emitting element 23 emits light (measuring light) having a specific wavelength within the range of wavelengths of the light which is reflected by the dichroic mirror **21*a* of the dichroic prism 21. The measuring light (externally-projecting light) emitted from the light-emitting element 23 is reflected by the dichroic mirror 21*a* to be projected toward the corner cube prism 17 via the objective lens 11. The light-emitting element 23 and the dichroic mirror 21*a* are elements of a light-transmitting optical system of the optical distance meter 20. The measuring light which is reflected by the corner cube prism 17 and passed through the objective lens 11 is reflected by the dichroic mirror 21*a* again. At this time, the wavelengths of the light bundles incident upon the dichroic mirror 21*a*, which are not within the range of wavelengths of the light which is reflected by the dichroic mirror 21*a*, pass through the dichroic mirror 21*a***.

A right-angle prism 22 which is an element of the optical distance meter 20 is disposed between the light-emitting element 23 and the dichroic prism 21. The right-angle prism 22 is positioned on one side (the upper side as viewed in FIG. 3) of a plane F (see FIG. 3) which includes the central axis of a light bundle incident on a light-receiving element 31 and the central axis of a light bundle emitted from the light-emitting element 23. Accordingly, the portion of the light bundle, emitted from the light-emitting element 23, which does not interfere with the right-angle prism 22 is made incident on the dichroic mirror **21*a* of the dichroic prism 21. Thereafter, the measuring light which is reflected by the dichroic mirror 21*a* and incident on a reflection surface 22*a* of the right-angle prism 22 is reflected by the reflection surface 22*a* to be incident on the light-receiving element 31. The dichroic mirror 21*a*, the reflection surface 22*a* and the light-receiving element 31 are elements of a light-receiving optical system of the optical distance meter 20**.

Figure 3:
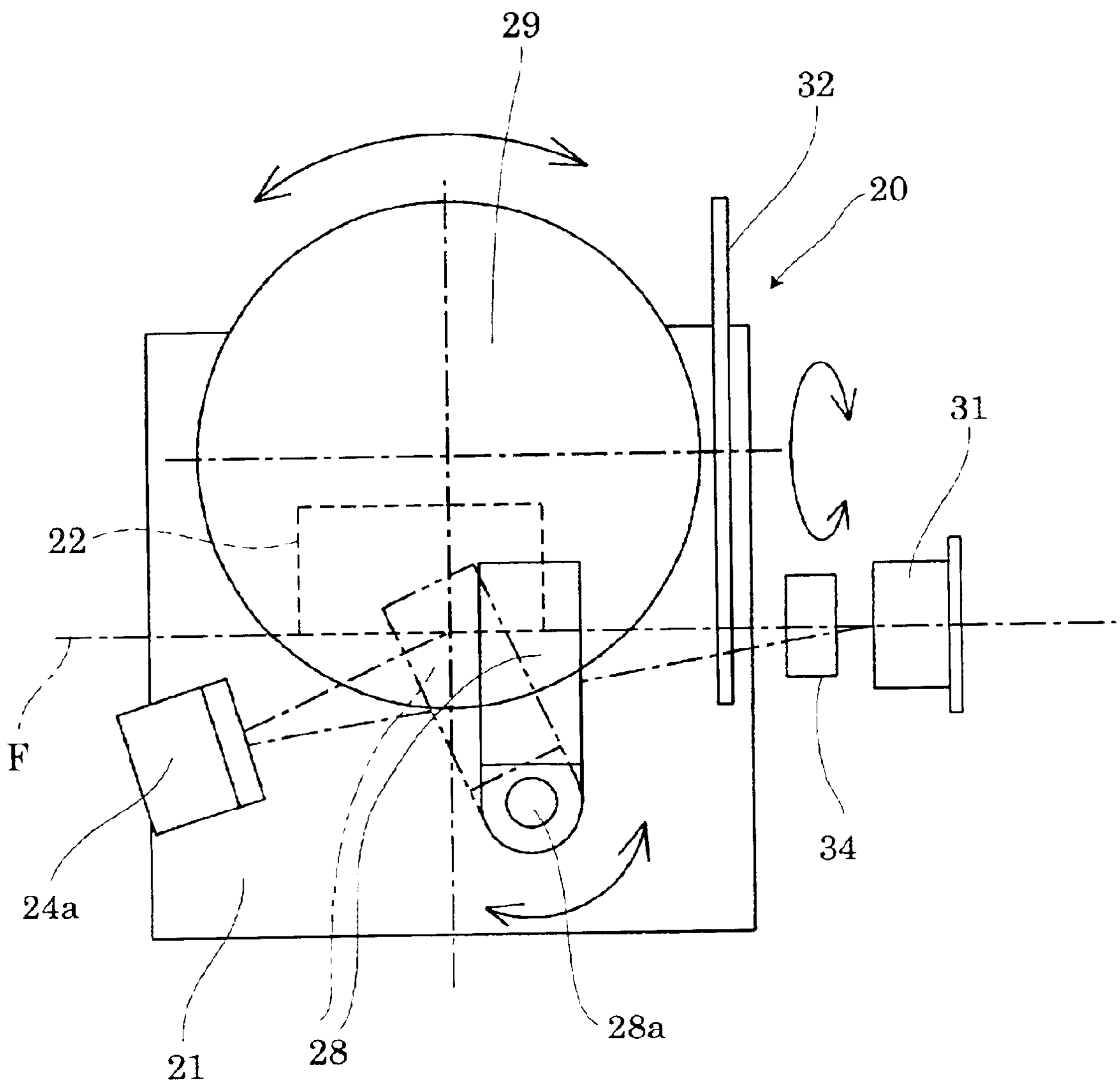
FIG. 3 is a plan view of a switching-mirror drive mechanism provided in the electronic distance meter shown in FIG. 1, viewed in the direction of an arrow III in FIG. 1.

The electronic distance meter is provided with a switching prism 28 and a first ND filter 29 between the right-angle prism 22 and the light-emitting element 23, on a distance-measuring optical path. As shown in FIG. 3, the switching prism 28 can rotate about a pivot **28*a* between an advanced position (the position shown by a two-dot chain line in FIG. 3) and a retracted position (the position shown by a solid line in FIG. 3). The light emitted by the light-emitting element 23 is incident on a first fixed mirror 24***a* and is reflected thereby to be incident as an internal reference light on the light-receiving element 31 via a second fixed mirror 24*b* when the switching prism 28 is positioned in the advanced position. On the other hand, the light emitted by the light-emitting element 23 is incident directly on the dichroic prism 21 when the switching prism 28 is positioned in the retracted position. The first ND filter 29 is used to adjust the amount of the measuring light incident on the corner cube prism 17.

The electronic distance meter is provided between the right-angle prism 22 and the light-receiving element 31, on a distance-measuring optical path, with a second ND filter 32 and a band-pass filter 34, in that order from the right-angle prism 22 to the light-receiving element 31. The light-receiving element 31 is connected to a controller (calculation control circuit) 40. The controller 40 is connected to an actuator 41 which drives the switching prism 28, and an indicating device (e.g., an LCD panel) 42 which indicates the calculated distance.

As known in the art, the optical distance meter 20 establishes two different states: one state wherein light emitted by the light-emitting element 23 is supplied to the dichroic prism 21 as the measuring light, and another state wherein the light is supplied to the fixed mirror 24*a* as the internal reference light, which are determined in accordance with the switching state of the switching prism 28 driven by the controller 40 via the actuator 41. As described above, the measuring light supplied to the dichroic prism 21 is projected toward the corner cube prism 17 via the dichroic mirror 21*a* and the objective lens 11, and the measuring light reflected by the corner cube prism 17 is incident on the light-receiving element 31 via the objective lens 11, the dichroic mirror 21*a*, the reflection surface 22*a*, the second ND filter 32 and the band-pass filter 34. The controller 40 detects the phase difference between the projecting light and the reflected light, and the initial phase of the internal reference light which is supplied to the light-receiving element 31 via the switching prism 28, the first fixed mirror 24*a*, and the second fixed mirror 24*b*, or the time difference between the projecting light and the reflected light, to calculate the distance from the electronic distance meter to the corner cube prism 17. The calculated distance is indicated by the indicating device 42. Such an operation of calculating the distance is well known in the art.

The present embodiment of the electronic distance meter is provided with a phase-difference detection AF sensor unit (phase-difference detection focus detecting device) 50 which is positioned appropriately with respect to the light path reflected by a reflection surface of the Porro prism 13. As shown in FIG. 5, the Porro prism 13 is of a type which employs three right angle prisms having six rectangular surfaces: an incident surface 13*a*, first through fourth reflection surfaces 13*b*, 13*c*, 13*d* and 13*e*, and an exit surface 13*f*, in that order from the incident light side. A semitransparent film is formed on the first reflection surface 13*b* so as to serve as a semitransparent mirror. The incident surface 13*a* extends perpendicular to an optical axis 13X (of the focusing lens 12) incident on the incident surface 13*a*. A portion of the light incident on the incident surface 13*a* is reflected downwards by the first reflection surface 13*b* at an angle of 90 degrees. The light reflected by the first reflection surface 13*b* is reflected by the second reflection surface 13*c* so that the optical axis reflected from the second reflection surface 13*c* extends normal (i.e., at an angle of 90 degrees in a direction to the left as viewed in FIG. 4) to a plane defined by the optical axis incident on the first reflection surface 13*b* and the optical axis incident on the second reflection surface 13*c*. The light reflected by the second reflection surface 13*c* is reflected upwards by the third reflection surface 13*d* at an angle of 90 degrees. The light reflected by the third reflection surface 13*d* is reflected rearwards by the fourth reflection surface 13*e* at an angle of 90 degrees to proceed in a direction parallel to the incident light on the incident surface 13*a*. The light reflected by the fourth reflection surface 13*e* exits from the exit surface 13*f* to be incident on the focal-plane plate 14. The exit surface 13*f* extends perpendicular to an optical axis 13Y emerging from the exit surface 13*f*. The eyepiece 15 is positioned on the optical axis 13Y.

A beam splitting prism (a right-angle prism) 18 is cemented to the semitransparent film formed on the first reflection surface 13*b*. The right-angle prism 18 is provided with an incident surface 18*a*, a reflection surface 18*b* and an exit surface 18*c*. The incident surface 18*a* is cemented to the semitransparent film formed on the first reflection surface 13*b*. The reflection surface 18*b* extends perpendicular to the incident surface 18*a* and reflects the incident light thereon upwards, normal to the exit surface 18*c*. The light reflected by the reflection surface 18*b* exits from the exit surface 18*c* to proceed toward the AF sensor unit 50. Accordingly, the light which is passed through the first reflection surface 13*b* and the incident surface 18*a* is projected toward the AF sensor unit 50 via the reflection surface 18*b* and the exit surface 18*c*, while the light which is reflected by the first reflection surface 13*b* is projected toward the eyepiece 15 via the second, third and fourth reflection surfaces 13*c*, 13*d* and 13*e*, and the exit surface 13*f* of the Porro prism 13.

Figure 4:
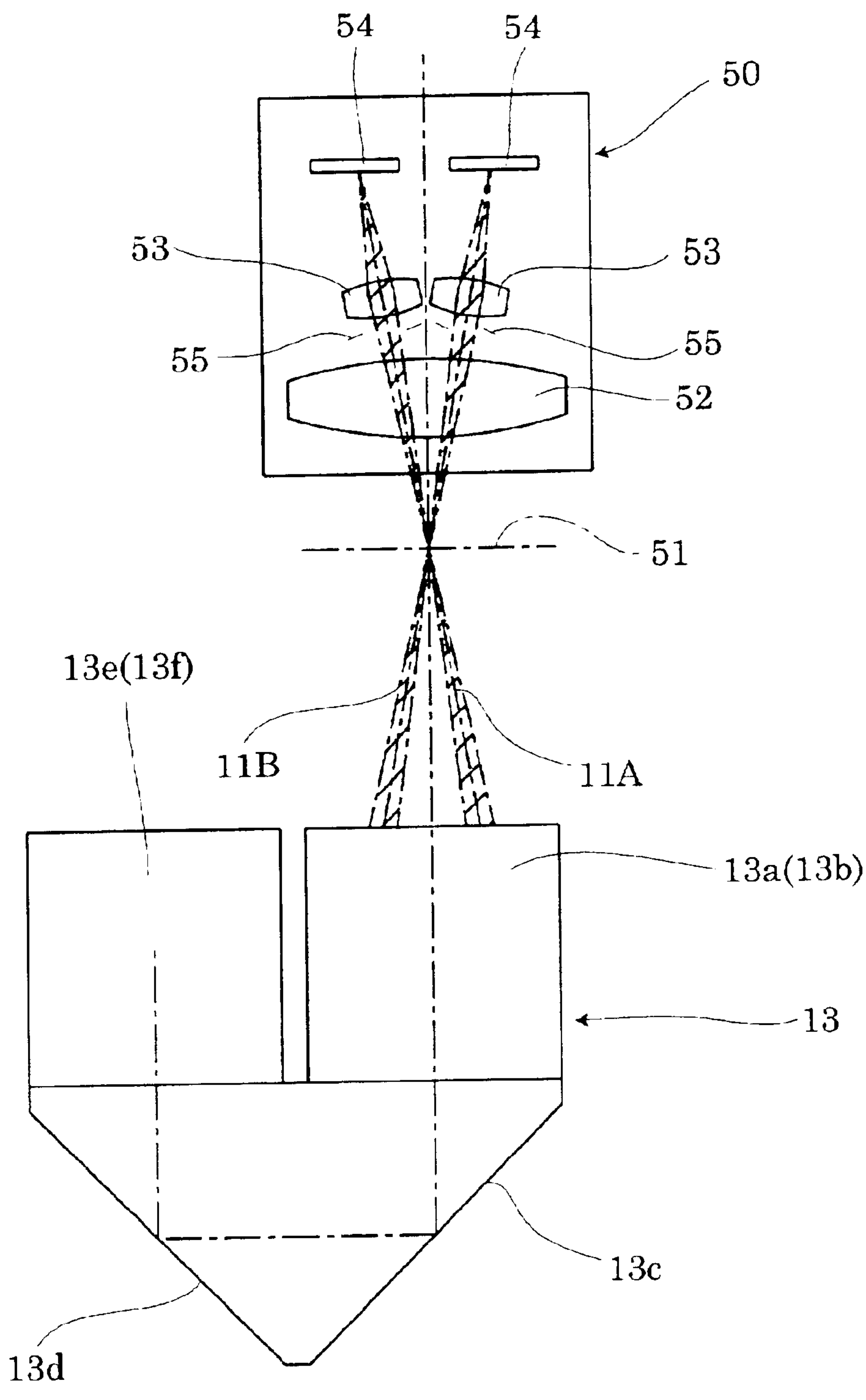
FIG. 4 is a conceptual diagram of the focus detecting device (AF sensor unit), as viewed in the direction of an arrow IV shown in FIG. 1.
Figure 5:
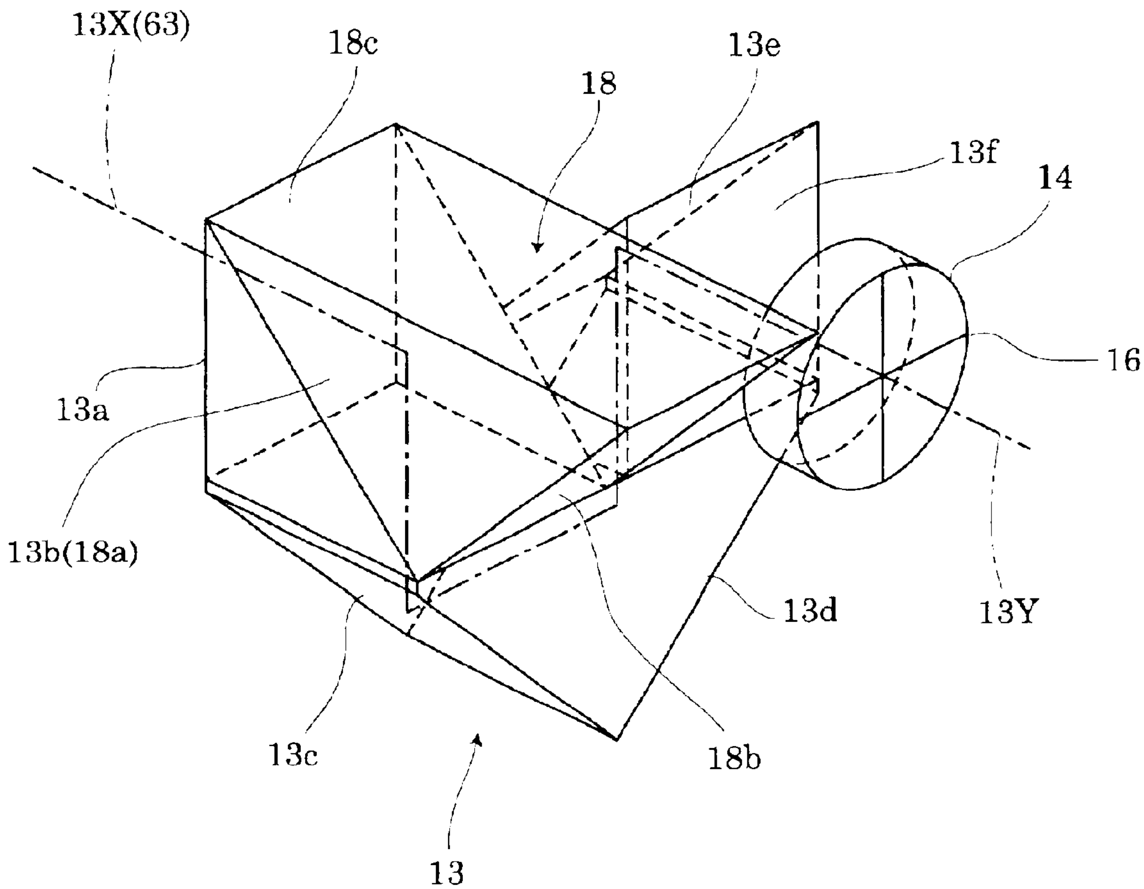
FIG. 5 is a perspective view of the Porro prism and the focal-plane plate shown in FIG. 1.

FIG. 4 shows a conceptual diagram of the AF sensor unit 50. A reference focal plane 51 is provided between the Porro prism 13 and the AF sensor unit 50, and is located at a position optically equivalent to the position at which the reticle 16 of the focal-plane plate 14 is placed. The AF sensor unit 50 detects the focus state (amount of defocus and direction of focal shift) on the reference focal plane 51. The AF sensor unit 50 includes a condenser lens 52, a pair of separator lenses 53, and a pair of line sensors (e.g., multi segment CCD sensors) 54 located behind the respective separator lenses 53. The pair of separator lenses 53 are arranged apart from each other by the base length. The image of the corner cube prism 17 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light thereon into electric charges which are integrated (accumulated), and outputs as an integrated electric charge to the controller 40 to constitute AF sensor data. The controller 40 calculates an amount of defocus through a predetermined defocus operation in accordance with a pair of AF sensor data respectively input from the pair of line sensors 54. In an autofocus operation, the controller 40 drives the focusing lens 12 to bring the corner cube prism 17 into focus via a lens drive motor 19 (see FIG. 1) in accordance with the calculated amount of defocus. The defocus operation is well-known in the art. An AF start switch 44 and a distance-measurement operation start switch 45 are connected to the controller 40.

The AF sensor unit 50 detects an in-focus state from the pair of images respectively formed on the pair of line sensors 54 by two light bundles 11A and 11B which are respectively passed through two different pupil areas (not shown) on the objective lens 11. The shape of each of the two pupil areas can be determined by the shape of the aperture formed on corresponding one of a pair of separator masks 55 which are respectively positioned in the vicinity of the pair of separator lenses 53 between the condenser lens 52 and the pair of separator lenses 53.

Figure 6:
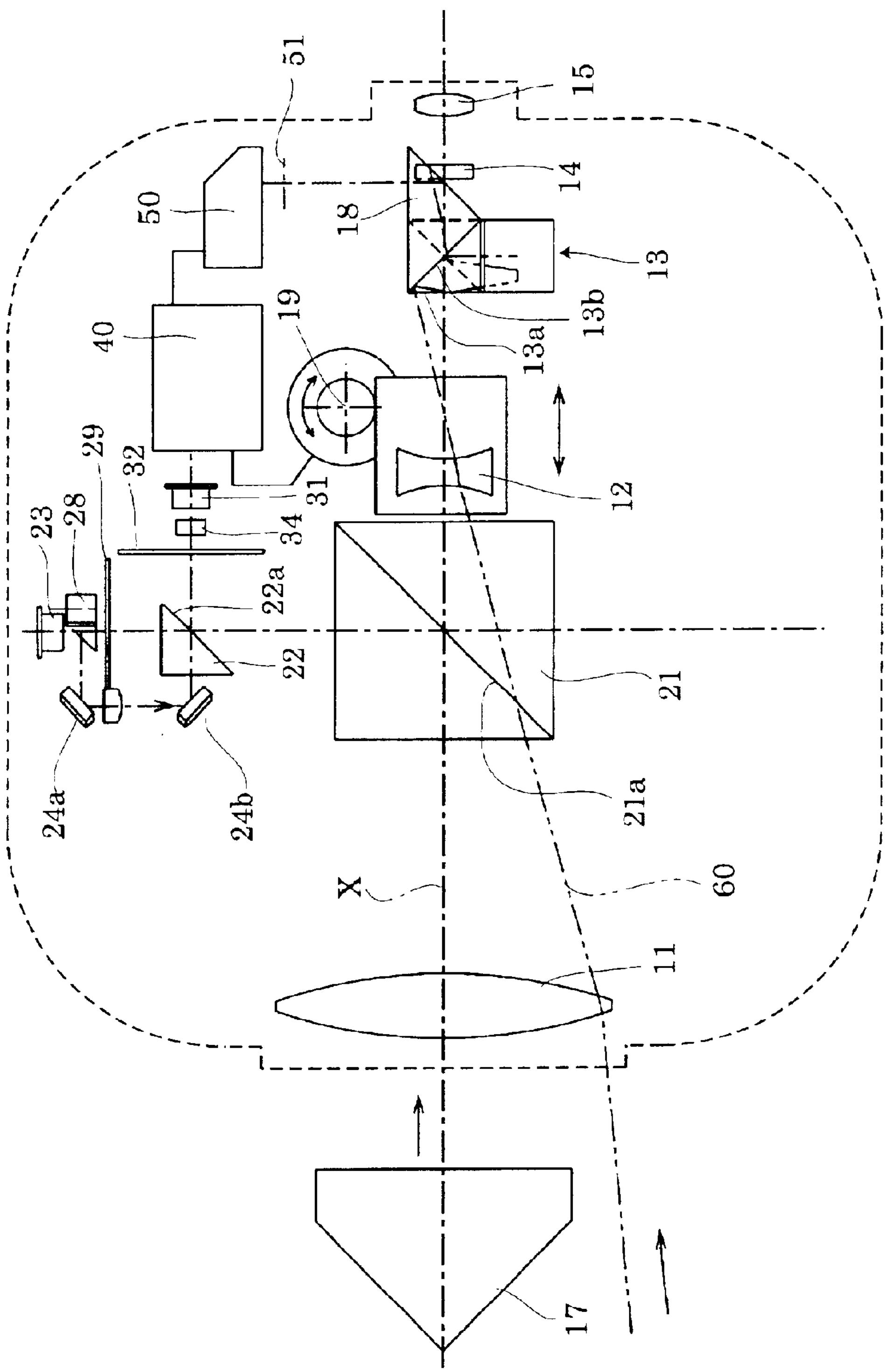
FIG. 6 is an explanatory view illustrating off-field light in the electronic distance meter shown in FIG. 1.
Figure 7:
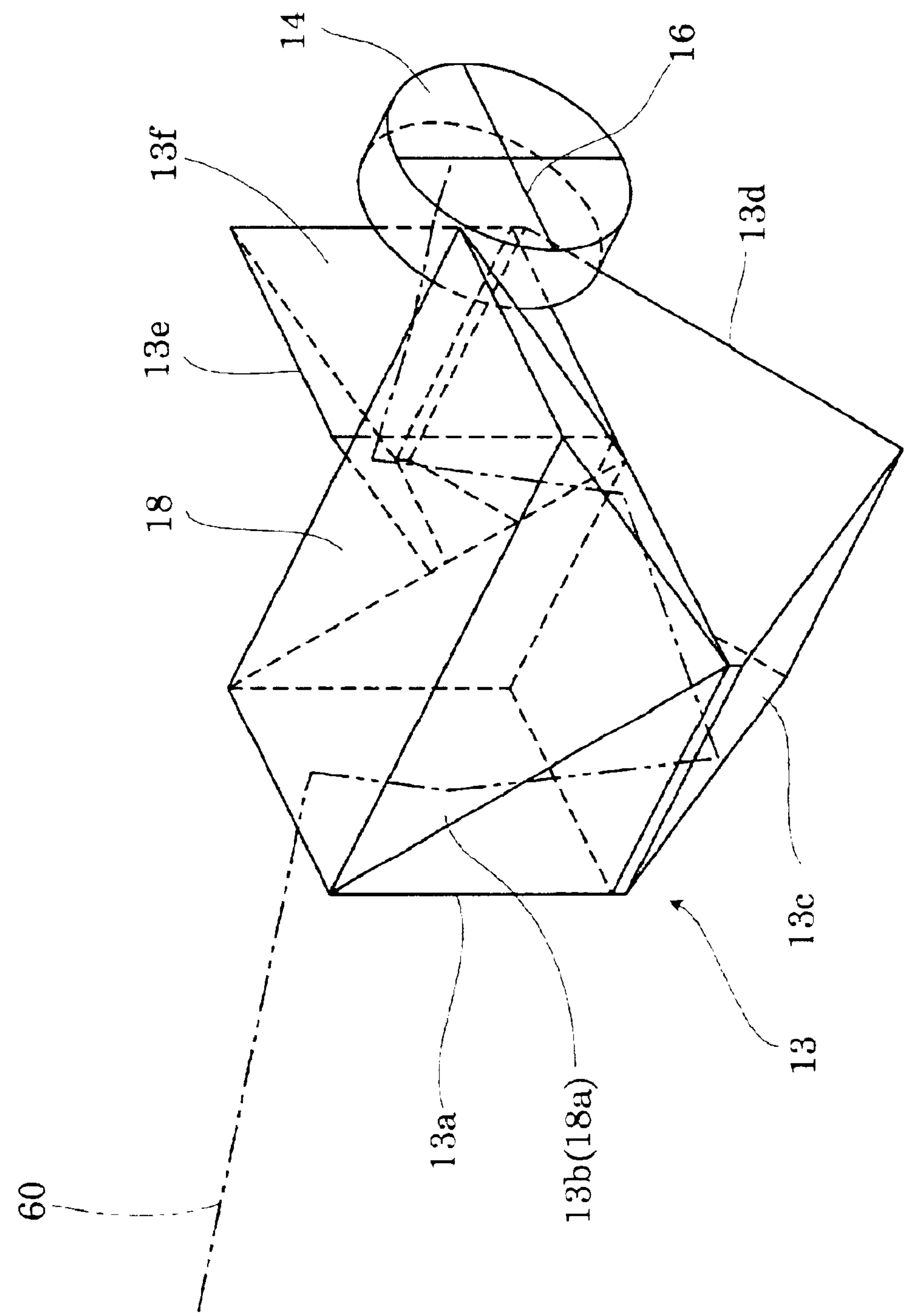
FIG. 7 is an explanatory view illustrating the off-field light bundle shown in FIG. 6.

FIGS. 6 and 7 are explanatory views similar to those of FIGS. 1 and 5 in regard to off-field light (non-image forming light) which causes a ghost image (or a flare spot). If an off-field light bundle 60, a principal ray of which is shown by one-dot chain line in FIG. 6, is incident on the objective lens 11 at a point on the front surface thereof in the vicinity of the maximum effective aperture of the objective lens 11, and is subsequently incident on the incident surface 13*a* of the Porro prism 13 in the vicinity of an end of the incident surface 13*a* by a specific angle in a manner as shown in FIG. 6, the off-field light bundle 60 is reflected by the first reflection surface 13*b* to return to the incident surface 13*a*. This returned off-field light bundle 60 is totally reflected by the incident surface 13*a* to form an image on the focal-plane plate 14 in the vicinity of the center thereof. This image is seen as a ghost image in the field of view of the sighting telescope 20 via the eyepiece 15. The ghost image tends to be seen easily especially when the intensity of the off-field light bundle 60 is high. A principal ray of a central light bundle 63 which is incident on the front surface of the objective lens 11 along the optical axis thereof and is subsequently incident on the incident surface 13*a* of the Porro prism 13 at the center thereof is shown in FIG. 5 for comparison with the off-field light bundle 60.

In a state where the first reflection surface 13*b* does not split the incident light (i.e., if semitransparent film is not formed on the first reflection surface 13*b*), the image-forming light traveling in the field of the sighting telescope optical system is totally reflected by the first reflection surface 13*b* since the image-forming light is incident on the first reflection surface 13*b* at an angle equal to or greater than the critical angle (e.g., approximately 41 degrees in the case of using BK7), while the off-field light bundle 60 mostly passes through the first reflection surface 13*b* (approximately five percent of the off-field light bundle 60 is reflected by the first reflection surface 13*b*) since the off-field light bundle 60 is incident on the first reflection surface 13*b* at an angle smaller than the critical angle. Therefore, the off-field light bundle 60 has little effect on the object image seen through the eyepiece. However, with the semitransparent film on the first reflection surface 13*b*, the reflectivity of the first reflection surface 13*b* increases. For example, even if the off-field light bundle 60 is incident on the first reflection surface 13*b* at an angle smaller than the critical angle, due to the increased reflectivity of the first reflection surface 13*b*, it is possible for the off-field light bundle 60 to be reflected thereby. If the Porro prism 13 is sufficiently large with respect to the effective aperture of the objective lens 11, the off-field light bundle 60 can be reflected by one or more sides of the Porro prism 13 but does not enter the field of the sighting telescope optical system. However, surveying instruments are required to be compact and easy to carry, which inevitably miniaturizes the Porro prism 13. If the Porro prism 13 is small in size, an off-field light bundle which travels in a specific direction is totally reflected by the incident surface 13*a* of the Porro prism 13 after having been reflected by the first reflection surface 13*b* thereof to be formed as a ghost image seen through the eyepiece. As a result, two images overlap each other to thereby deteriorate the performance (e.g., a resolution) of the sighting telescope. Moreover, the off-field light bundle 60 which partly passes through the first reflection surface 13*b* and reaches the AF sensor unit 50 has the adverse effect of deteriorating the precision of the AF sensor unit 50.

Figure 8:
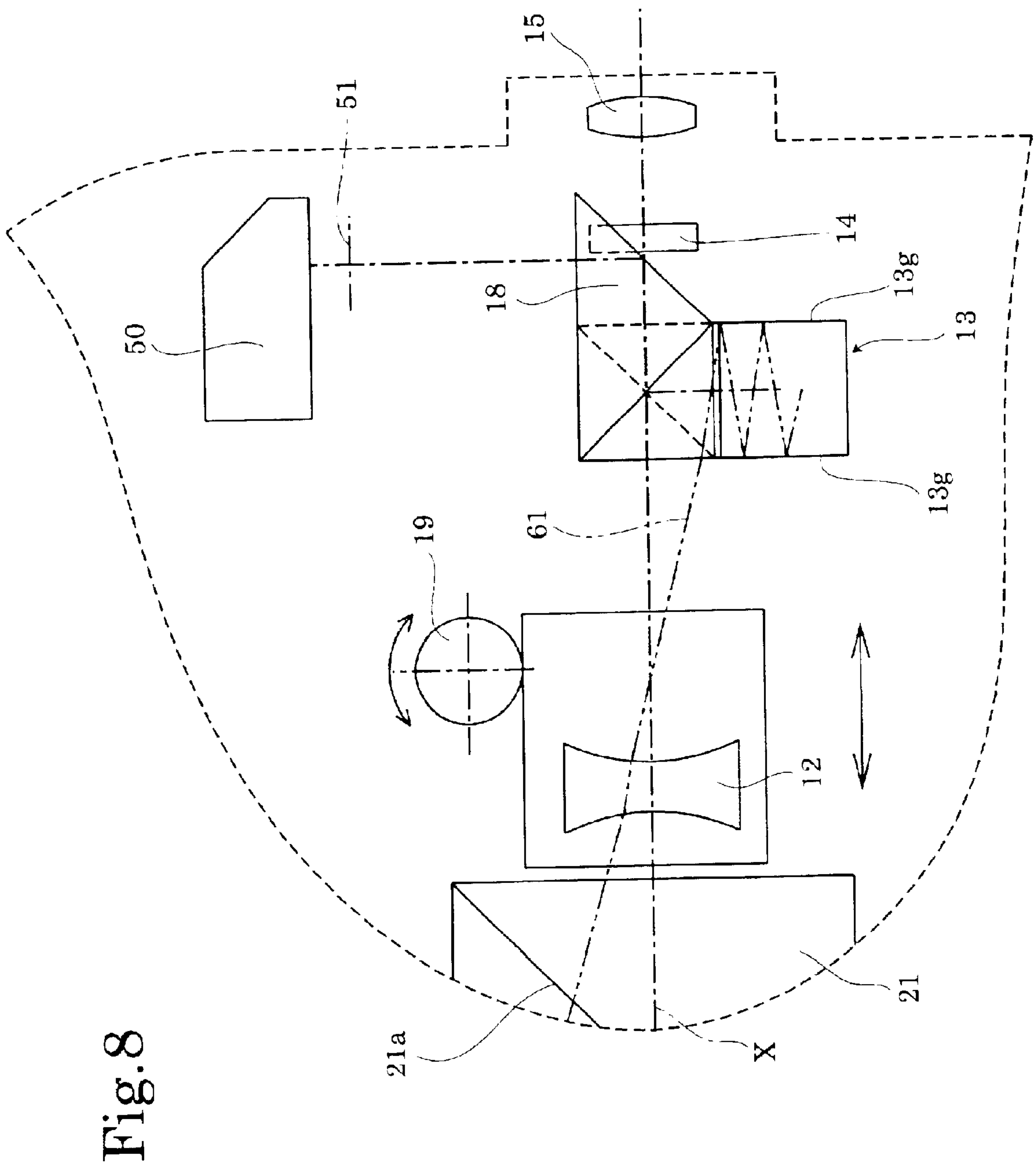
FIG. 8 is a fragmentary diagram of the electronic distance meter shown in FIG. 1 and illustrates another off-field light bundle which travels in a different direction.

FIG. 8 shows a principal ray of another off-field go light bundle 61 which travels in a direction different from that of the above described off-field light bundle 60 to discuss problems of the off-field light bundle 61. The off-field light bundle 61 is incident on the Porro prism 13 in a direction which is symmetrical to the direction of the off-field light bundle 60 with respect to the optical axis X. The off-field light bundle 61 is repeatedly reflected by a side 13*g* of the Porro prism 13, and therefore has little effect on the object image seen through the eyepiece 15. However, it is preferable that such reflections of the off-field light bundle 61 not exist. Each of all the sides of the Porro prism 13 except the incident surface 13*a*, the first and fourth reflection surfaces 13*b* through 13*e* and the exit surface 13*f* is preferably formed as a matt surface.

Specific problems for the case where the first reflection surface 13*b* of the Porro prism 13 is formed as a semitransparent mirror used for detecting a focus have been discussed above. However, even if the Porro prism 13 is not provided with a semitransparent mirror (i.e., even if the electronic distance meter is not provided with a focus detection system), an off-field light bundle sometimes causes a ghost image. In addition, if there is an object which gives off light of a high intensity, an adverse effect in the field of view of the sighting telescope occurs if one of the reflection surfaces of the Porro prism 13, except the first reflection surface 13*b* thereof, is formed as a semitransparent mirror serving as a beam splitter.

The present embodiment of the electronic distance meter is equipped with a ghost image formation preventing device for preventing the formation of the above described ghost images. More specifically, the present embodiment of the electronic distance meter is provided, in an optical path extending from the incident surface 13*a* to the exit surface 13*f* of the Porro prism 13, with a light shield device for preventing off-field light bundles which is incident on the Porro prism 13 from reaching the AF sensor unit 50, or is provided, in an optical path extending from the first reflection surface 13*b* to the AF sensor unit 50, with a light shield device for preventing off-field light bundles which is incident on the first reflection surface 13*b* from reaching the AF sensor unit 50.

FIGS. 9 through 21 show the first through six embodiments of the ghost image formation preventing devices. In each of these embodiments, a semitransparent film is formed on the first reflection surface 13*b* so as to serves as a semitransparent mirror. More specifically, the beam splitting prism 18 is cemented to the semitransparent film formed on the first reflection surface 13*b*.

Figure 9:
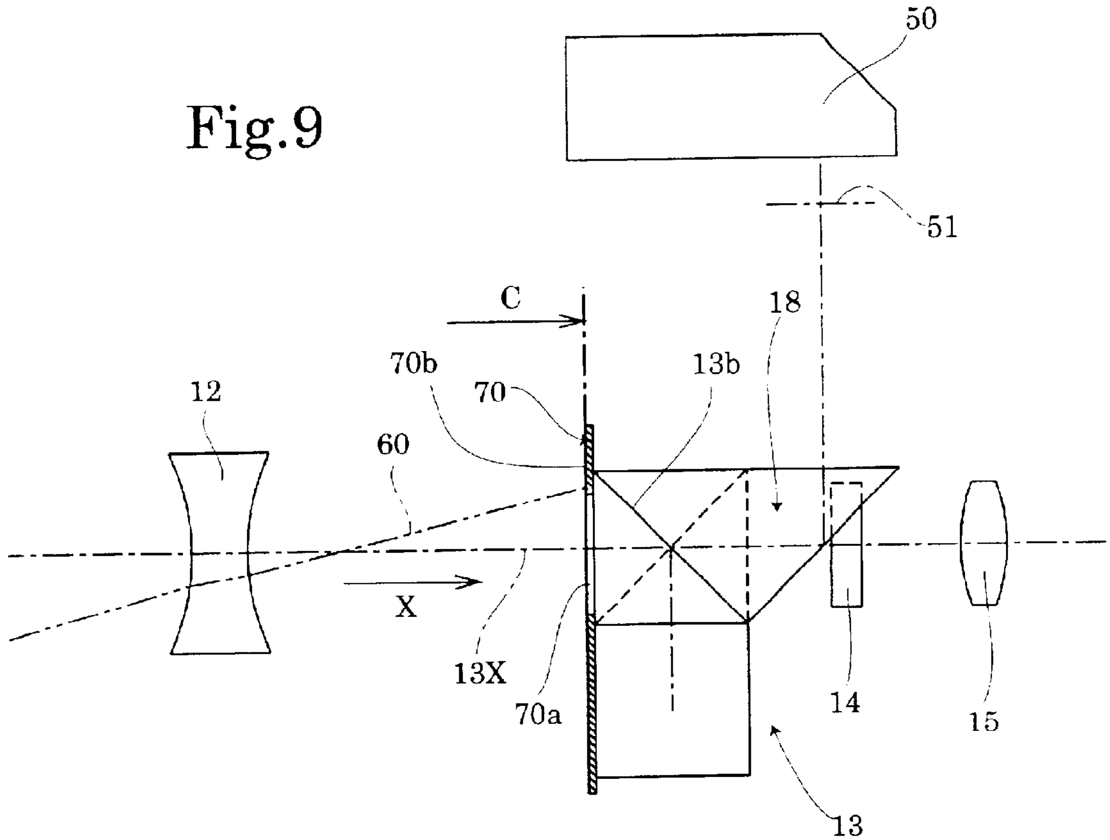
FIG. 9 is a side elevational view of a fundamental portion of the electronic distance meter shown in FIG. 1, illustrating the first embodiment of a ghost image formation preventing device according to the present invention.
Figure 10:
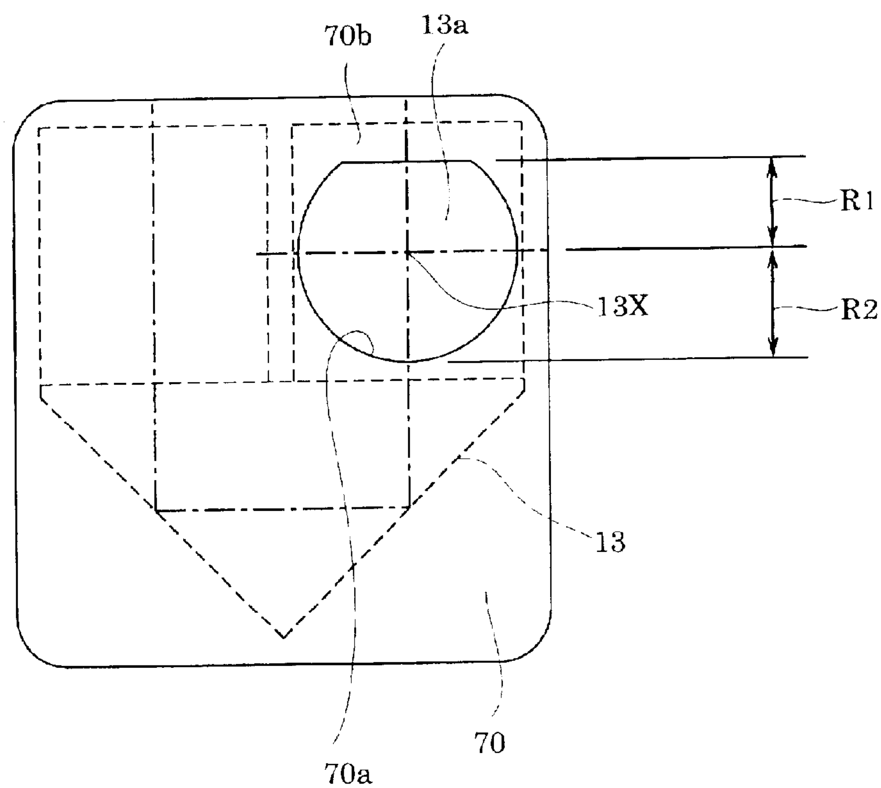
FIG. 10 is a front elevational view of a fundamental portion of the ghost image formation preventing device shown in FIG. 9, as viewed in the direction of an arrow X shown in FIG. 9.

FIGS. 9 and 10 show the first embodiment of the ghost image formation preventing device. In this embodiment, a light shield plate 70 having an aperture 70*a* is disposed immediately in front of the incident surface 13*a* of the Porro prism 13 to prevent off-field light bundle 60 from entering into the Porro prism 13. Only the light which is passed through the aperture 70*a* is allowed to enter into the Porro prism 13. The above described off-field light bundle 60, shown by a two-dot chain line in FIG. 6, has a greater adverse effect on the field of view of the sighting telescope 20 as the optical path length from the incident surface 13*a* to the first reflection surface 13*b* is shorter. To prevent this problem from occurring, in the first embodiment shown in FIGS. 9 and 10, the aperture 70*a* of the light shield plate 70 is shaped to be asymmetrical with respect to the optical axis 13X as shown in FIG. 10, while the light shield plate 70 is provided, immediately above the substantially-circular shaped aperture 70*a*, with a light shield portion 70*b* which makes the shape of the aperture 70*a* imperfect circle. With the light shield portion 70*b*, a radial length R1 (see FIG. 10) of the aperture 70*a* from the optical axis 13X to a side of the aperture 70*a* (the upper side as viewed in FIGS. 9 and 10), where the optical path length between the incident surface 13*a* and the first reflection surface 13*b* in the horizontal direction as viewed in FIG. 9 is the shortest, is shorter than a radial length R2 from the optical axis 13X to the other side (the lower side as viewed in FIGS. 9 and 10) of the aperture 70*a* where the optical path length between the incident surface 13*a* and the first reflection surface 13*b* in the horizontal direction as viewed in FIG. 9 is the longest. In other words, an area of the aperture 70*a* above a horizontal line intersecting the optical axis 13*x* at right angles is smaller than the remaining area of the aperture 70*a* below the horizontal line.

Figure 11:
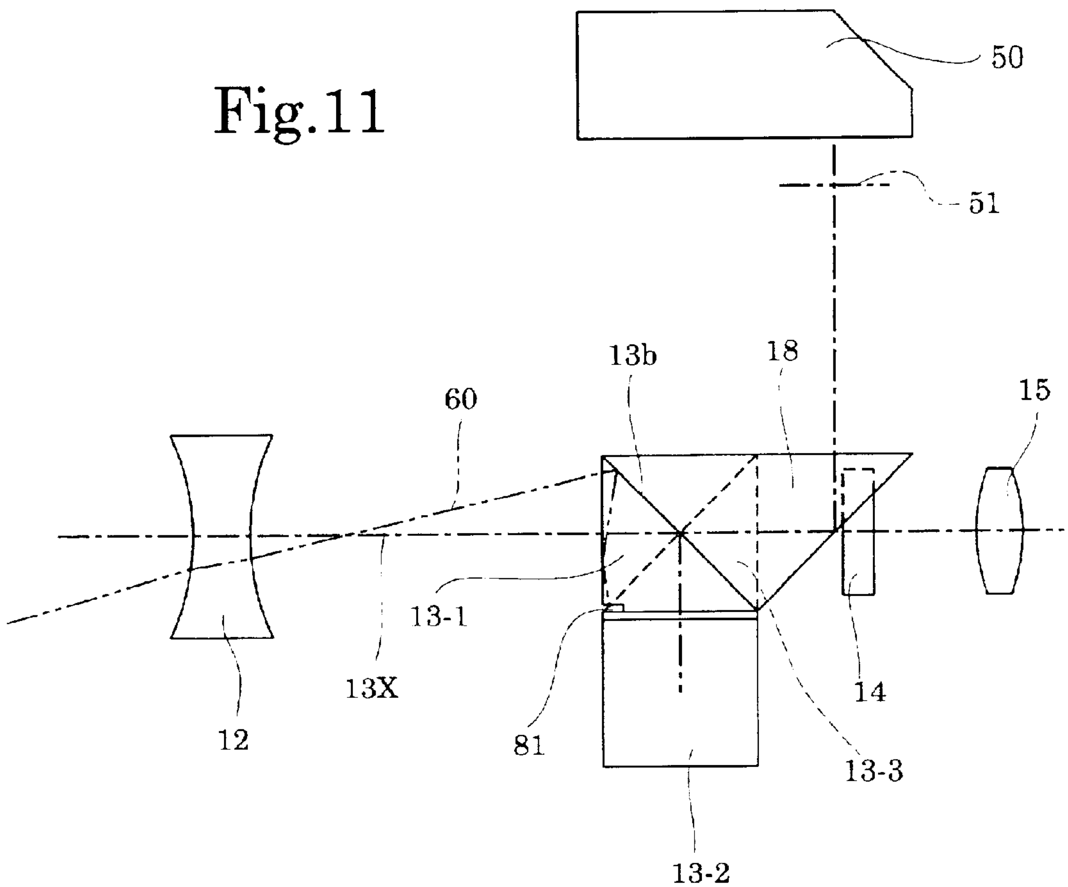
FIG. 11 is a side elevational view similar to that of FIG. 9, illustrating the second embodiment of the ghost image formation preventing device according to the present invention.
Figure 12:
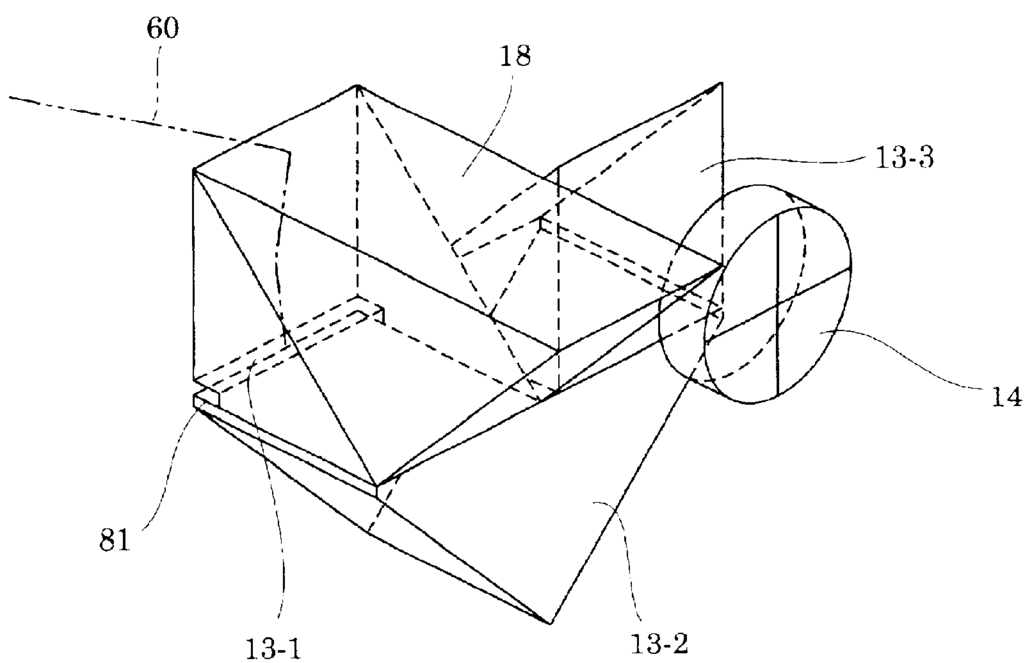
FIG. 12 is a perspective view of the Porro prism and the focal-plane plate shown in FIG. 11.
Figure 13:
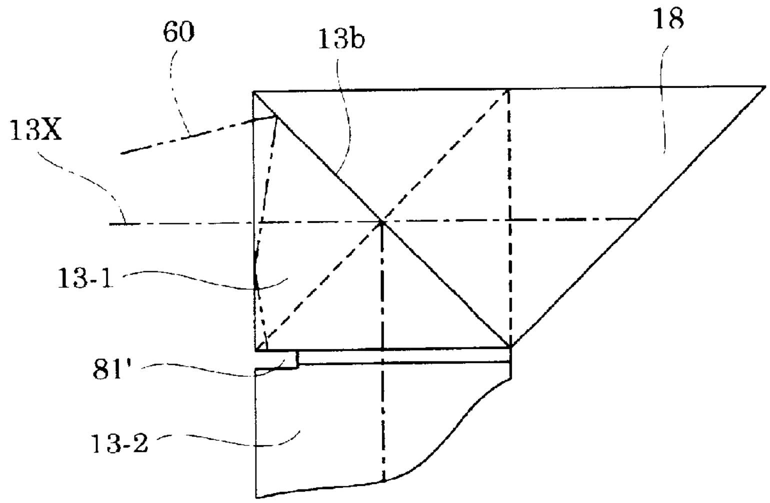
FIG. 13 is a side elevational view of another embodiment of a fundamental portion of the second embodiment of the ghost image formation preventing device shown in FIG. 11.

FIGS. 11 and 12 show the second embodiment of the ghost image formation preventing device. In this embodiment, the Porro prism 13 includes a first prism 13-1 having the incident surface 13*a* and the first reflection surface 13*b*, a second prism 13-2 having the second and third reflection surfaces 13*c* and 13*d*, and a third prism 13-3 having the fourth reflection surface 13*e* and the exit surface 13*f*. The first prism 13-1 and the third prism 13-3 are each cemented to the second prism 13-2. The Porro prism 13 is provided, on a common edge of the cemented surface of the first prism 13-1 and the second prism 13-2, with a recessed portion so that it is positioned in an optical path of the off-field light bundle 60. In the embodiment shown in FIG. 12, a recessed portion 81 is formed on the first prism 13-1. As shown in FIG. 13, a recessed portion 81' corresponding to the recessed portion 81 can be formed on the second prism 13-2. The recessed portion may be formed on both of the first prism 13-1 and the second prism 13-2.

Figure 14:
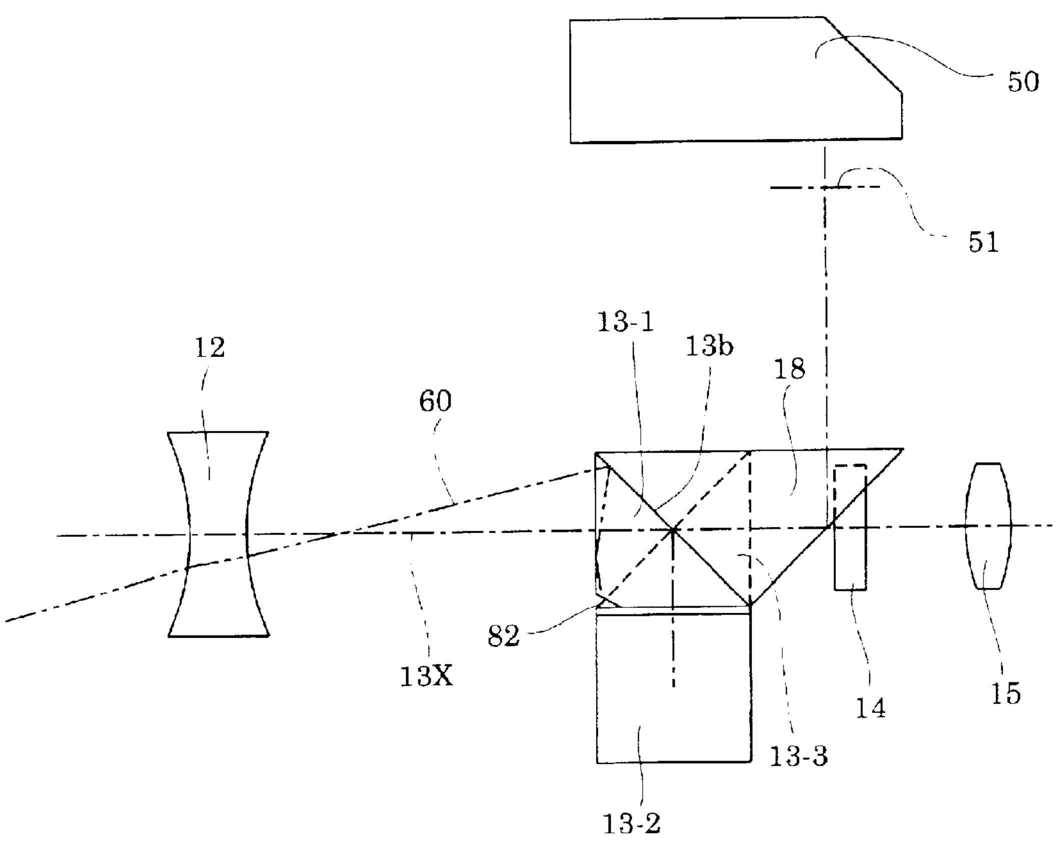
FIG. 14 is a side elevational view similar to that of FIG. 9 and illustrates the third embodiment of the ghost image formation preventing device according to the present invention.
Figure 15:
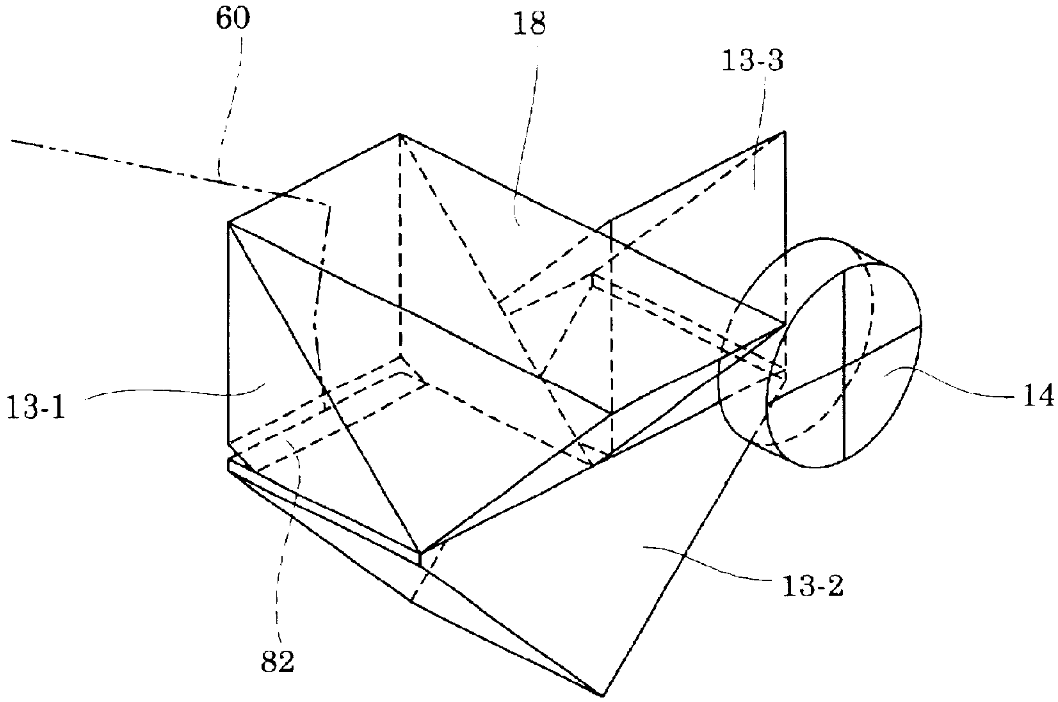
FIG. 15 is a perspective view of the Porro prism and the focal-plane plate shown in FIG. 14.
Figure 16:
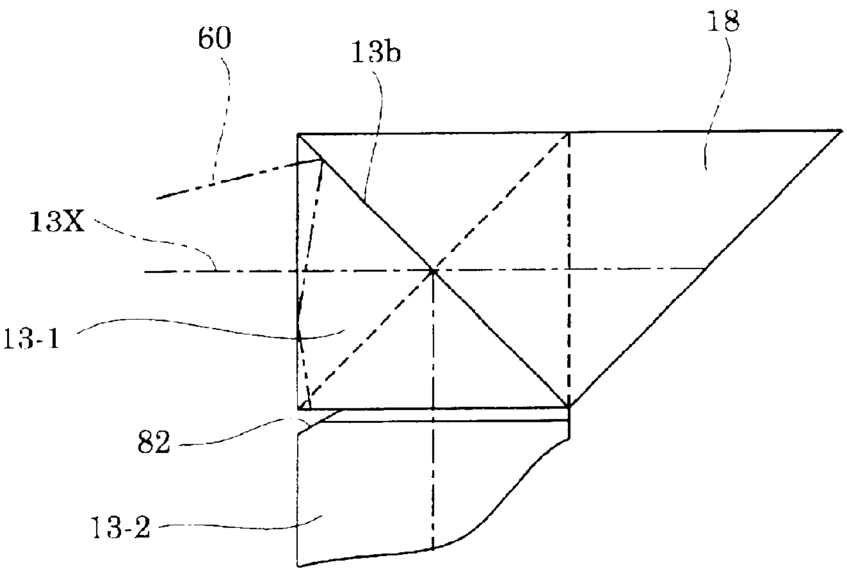
FIG. 16 is a side elevational view of another embodiment of a fundamental portion of the third embodiment of the ghost image formation preventing device shown in FIG. 14.

FIGS. 14 and 15 show the third embodiment of the ghost image formation preventing device. The third embodiment is the same as the above described second embodiment except that the Porro prism 13 is provided, on a common edge of the cemented surface of the first prism 13-1 and the second prism 13-2, with a beveled surface instead of the recessed portion of the second embodiment. In the embodiment shown in FIG. 15, the beveled surface 82 is formed on the first prism 13-1 along the edge of the cemented surface, i.e. the edge of the first prism 13-1 is beveled. As shown in FIG. 16, a beveled surface 82' corresponding to the beveled surface 82 can be formed on the second prism 13-2.

According to each of the second and third embodiments, the off-field light bundle 60 which reaches the recessed portion 81 (81') or the beveled surface 82 (82') after being reflected by the first reflection surface 13*b* does not proceed further therefrom, and therefore does not reach the AF sensor unit 50 or the eyepiece lens 15. It is preferable that the surface of each of the recessed portion 81 (81') and the beveled surface 82 (82') be formed as a matt surface, e.g., coated with a matt coating.

Figure 17:
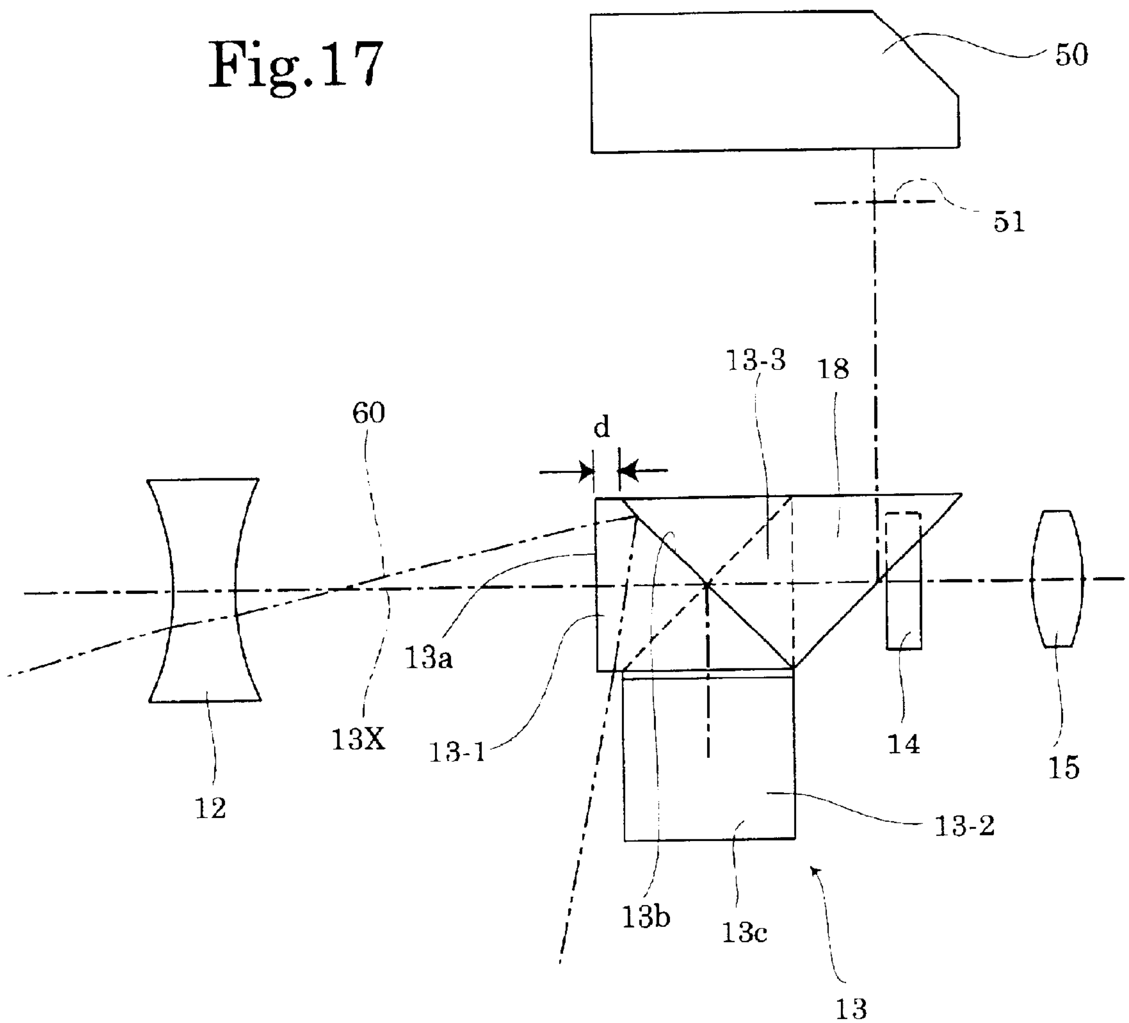
FIG. 17 is a side elevational view similar to that of FIG. 9, illustrating the fourth embodiment of the ghost image formation preventing device according to the present invention.
Figure 18:
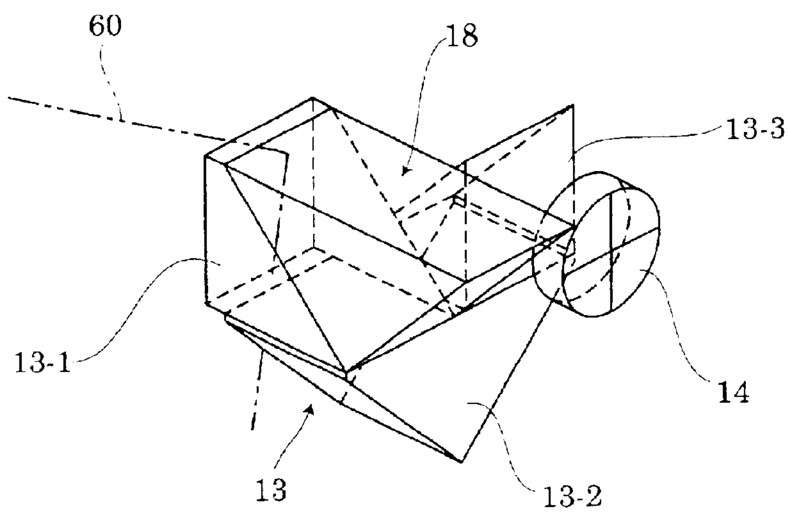
FIG. 18 is a perspective view of the Porro prism and the focal-plane plate shown in FIG. 17.

FIGS. 17 through 18 show the fourth embodiment of the ghost image formation preventing device. In this embodiment, the first prism 13-1 is shaped to extend forward (leftward as viewed in FIG. 17) so that the incident surface 13*a* becomes closer to the focusing lens 12. With this structure, the off-field light bundle 60 which is reflected by the first reflection surface 13*b* is not incident on the second reflection surface 13*c*, but exits from the bottom of the forwardly-extended portion of the first prism 13-1. The bottom surface of the forwardly-extended portion of the first prism 13-1 can be coated with a matt coating so as to reflect, diffuse or absorb the incident light thereon. As is clearly shown in FIG. 17, the first prism 13-1 of this embodiment is formed to extend toward the focusing lens 12 so that the respective upper ends of the incident surface 13*a* and the first reflection surface 13*b* are not connected to each other but are apart from each other by a distance d.

Each of the above described first through fourth embodiments can be combined with another one or more embodiments if necessary. Furthermore, the Porro prism 13 can be provided, on each bonding surface among the first through third prisms 13-1, 13-2 and 13-3, with a light shield mask for preventing the off-field light bundle from entering the field of view of the sighting telescope 20.

FIGS. 19 through 27 show the fifth through eighth embodiments of the ghost image formation preventing devices. Each of the fifth through eighth embodiments is constructed so that the off-field light bundle 60 which is passed through a reflection surface of the Porro prism 13 does not reach the AF sensor unit 50.

Figure 19:
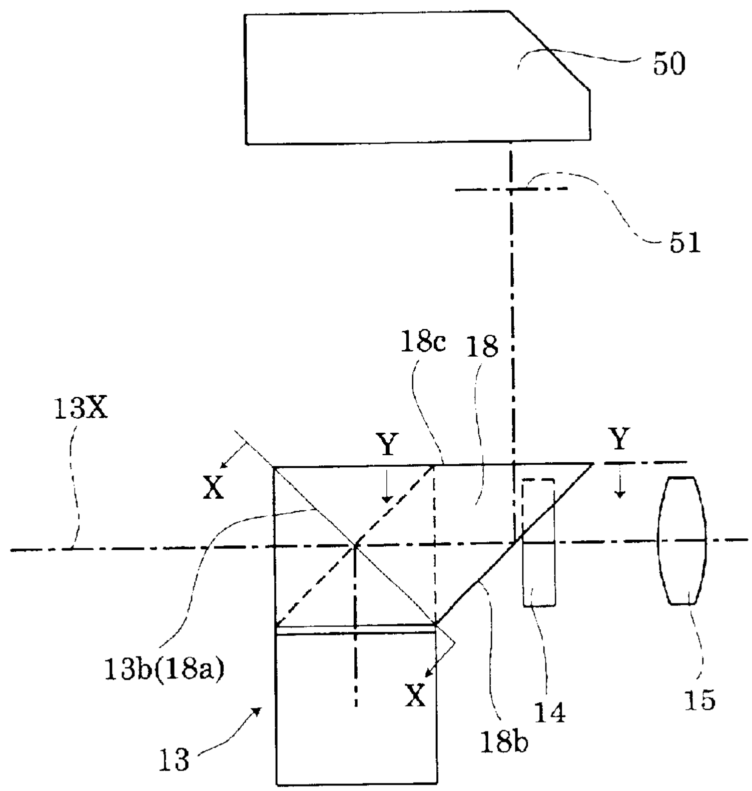
FIG. 19 is a side elevational view similar to that of FIG. 9, illustrating the fifth embodiment of the ghost image formation preventing device according to the present invention.
Figure 20:
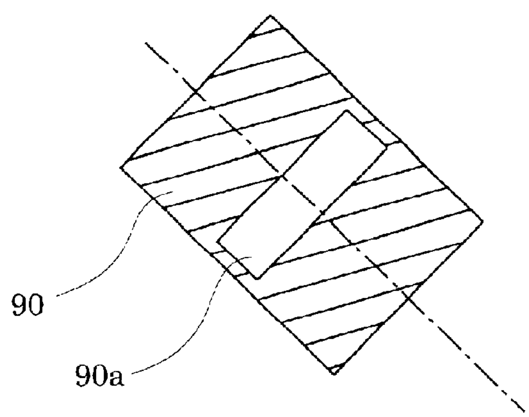
FIG. 20 is a plan view of a light shield mask provided in a Porro prism shown in FIG. 19, viewed in the direction of arrows X in FIG. 19.
Figure 21:
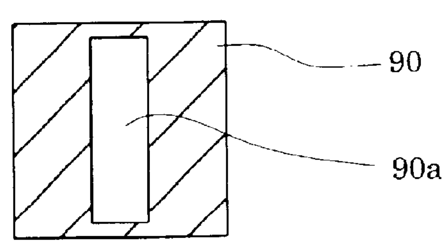
FIG. 21 is a plan view of another light shield mask provided in the Porro prism shown in FIG. 19, viewed in the direction of arrows Y in FIG. 19.
Figure 22:
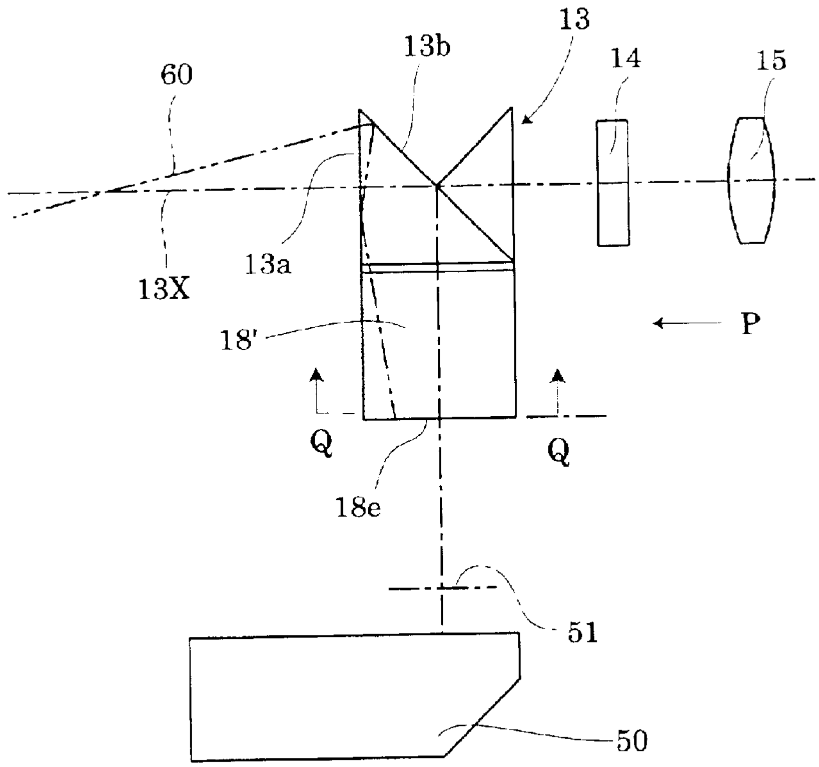
FIG. 22 is a view similar to that of FIG. 9 and illustrates the sixth embodiment of the ghost image formation preventing device according to the present invention.
Figure 23:
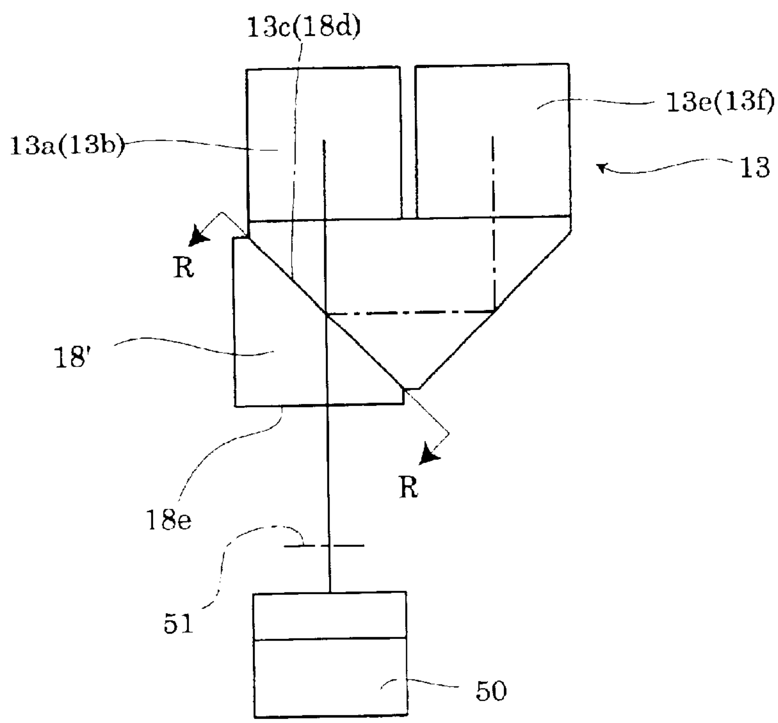
FIG. 23 is a rear elevational view of a fundamental portion of the ghost image formation preventing device shown in FIG. 22, viewed in the direction of an arrow P shown in FIG. 22.
Figure 24:
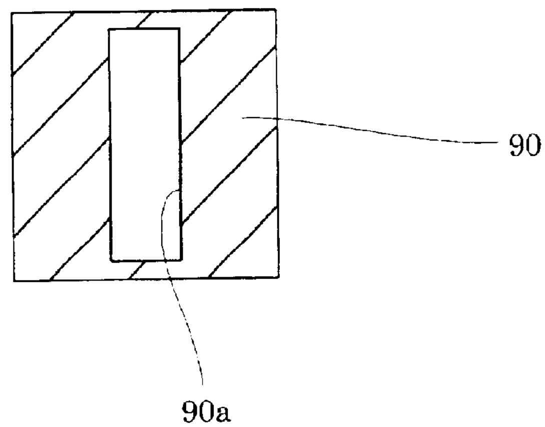
FIG. 24 is a plan view of a light shield mask provided in a Porro prism shown in FIG. 22, viewed in the direction of arrows Q in FIG. 22.
Figure 25:
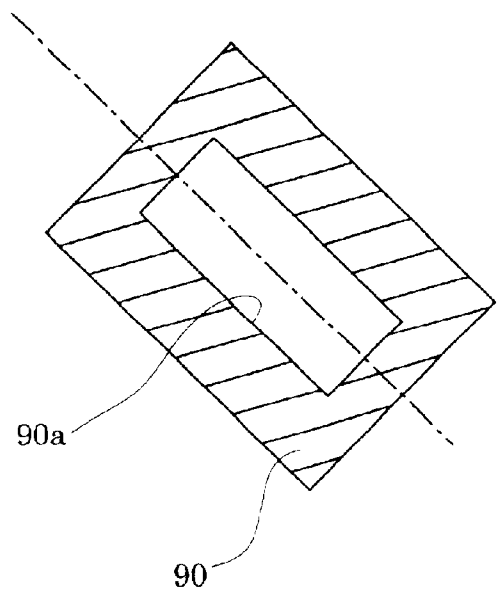
FIG. 25 is a plan view of another light shield mask provided in the Porro prism shown in FIG. 22, viewed in the direction of arrows R in FIG. 23.

FIGS. 19 through 21 show the fifth embodiment of the ghost image formation preventing device. In this embodiment, a semitransparent film is formed on the first reflection surface 13*b* so as to serve as a beam splitter. Moreover, a rectangular light shield mask 90 (see FIG. 20) having an elongated rectangular aperture 90*a* is fixed between the first reflection surface 13*b* and the incident surface 18*a* of the right-angle prism 18. Furthermore, a similar light shield mask 90 (see FIG. 21) is fixed to the exit surface 18*c*. The light shield mask 90 provided between the first reflection surface 13*b* and the incident surface 18*a* reflects, absorbs or diffuses the incident light thereon. If the shape of the aperture 90*a* is determined so that only the two light bundles 11A and 11B (see FIG. 4) which are respectively passed through two different pupil areas of the AF sensor unit 50 can pass through the aperture 90*a*, not only the off-field light bundle 60 but any other stray light can be cut off to ensure accuracy of the AF sensor unit 50. The hatched portions shown in FIGS. 20 and 21 show a portion (light interception member) other than the aperture 90*a*.

FIGS. 22 through 25 show the sixth embodiment of the ghost image formation preventing device. In this embodiment, a semitransparent film is formed on the second reflection surface 13*c* so as to serve as a beam splitter, and a right-angle prism 18' is cemented to the semitransparent film formed on the second reflection surface 13*c*. Moreover, a light shield mask 90 (see FIGS. 24 and 25) having an elongated rectangular aperture 90*a*, which is identical to that in the above described fifth embodiment, is fixed between the second reflection surface 13*c* and an incident surface 18*d* of the right-angle prism 18', while the same light shield mask 90 is fixed to an exit surface 18*e* of the right-angle prism 18'. Accordingly, it can be freely determined which of the reflection surfaces of the Porro prism 13 is formed as a semitransparent mirror. The light shield mask 90 can be positioned to correspond to the position of the semitransparent mirror and/or the position of the exit surface of the right-angle prism 18 or 18' that is cemented to the semitransparent mirror. The shape of the aperture 90*a* of the light shield mask 90 is identical to that of the light shield mask 90 shown in FIGS. 20 and 21.

Figure 26:
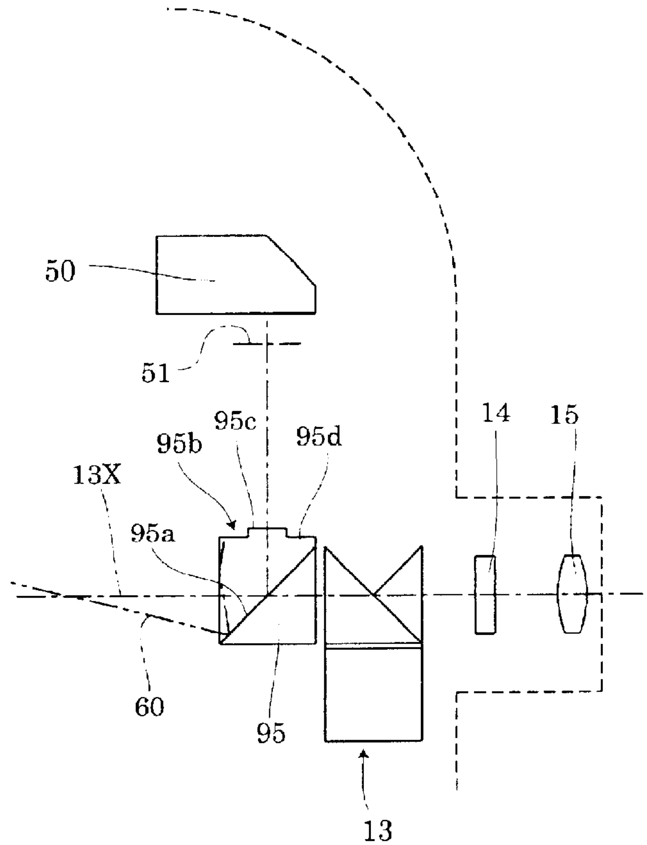
FIG. 26 is a side elevational view similar to that of FIG. 9, illustrating the seventh embodiment of the ghost image formation preventing device according to the present invention.

FIG. 26 shows the seventh embodiment of the ghost image formation preventing device. In this embodiment, a beam splitting prism 95 that is provided independently from the Porro prism 13 is disposed in front of the Porro prism 13. A semitransparent film 95*a* is formed on the beam splitting prism 95 to reflect part of the incident light on the semitransparent film 95*a* toward the AF sensor unit 50. The beam splitting prism 95 is provided on an exit surface 95*b* thereof (the upper surface as viewed in FIG. 26) with a raised transparent portion 95*c* and a non-transparent peripheral portion 95*d* whose surface is formed as a matt surface (e.g., coated with a matt coating).

Figure 28:
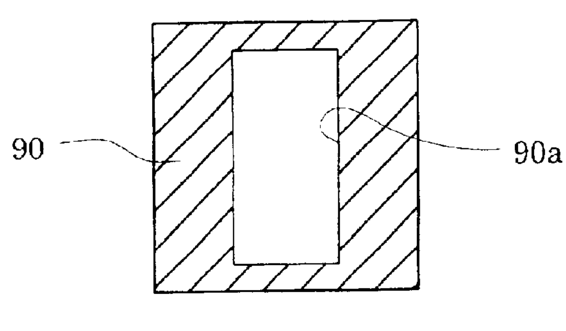
FIG. 28 is a plan view of a light shield mask provided in the Porro prism shown in FIG. 22, viewed in the direction of arrows S in FIG. 27.
Figure 27:
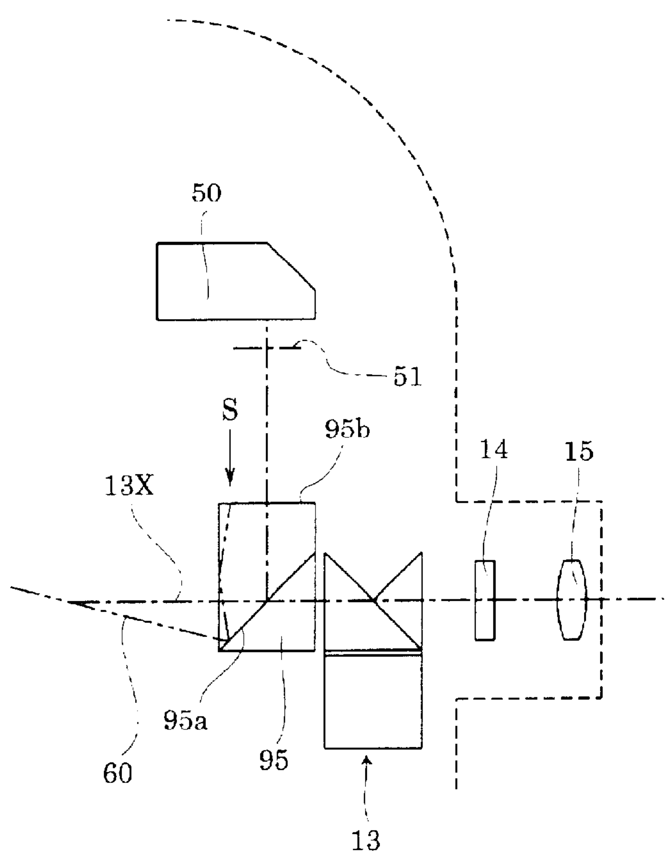
FIG. 27 is a side elevational view similar to that of FIG. 26, illustrating the eighth embodiment of the ghost image formation preventing device according to the present invention.

FIG. 27 shows the eighth embodiment of the ghost image formation preventing device. This embodiment is to the same as the seventh embodiment shown in FIG. 26 except that the beam splitting prism 95 of the eighth embodiment is provided on an exit surface 95*b* thereof (the upper surface as viewed in FIG. 27) with a light shield mask 90 (see FIG. 28) having the elongated rectangular aperture 90*a*, which is to the same as that in the above described each of fifth and sixth embodiments, not with the raised transparent portion 95*c* and the non-transparent peripheral portion 95*d*. In FIG. 28, the hatched portion shows a portion (light interception member) other than the aperture 90*a*.

In the seventh embodiment shown in FIG. 26, the shape of the raised transparent portion 95*c* can be determined to correspond to the shape of the elongated rectangular aperture 90*a* of the light shield mask 90. According to each of the seventh and eighth embodiments, the off-field light bundle 60 is effectively prevented from entering the AF sensor unit 50, which ensures accuracy of the AF sensor unit 50.

Figure 30:
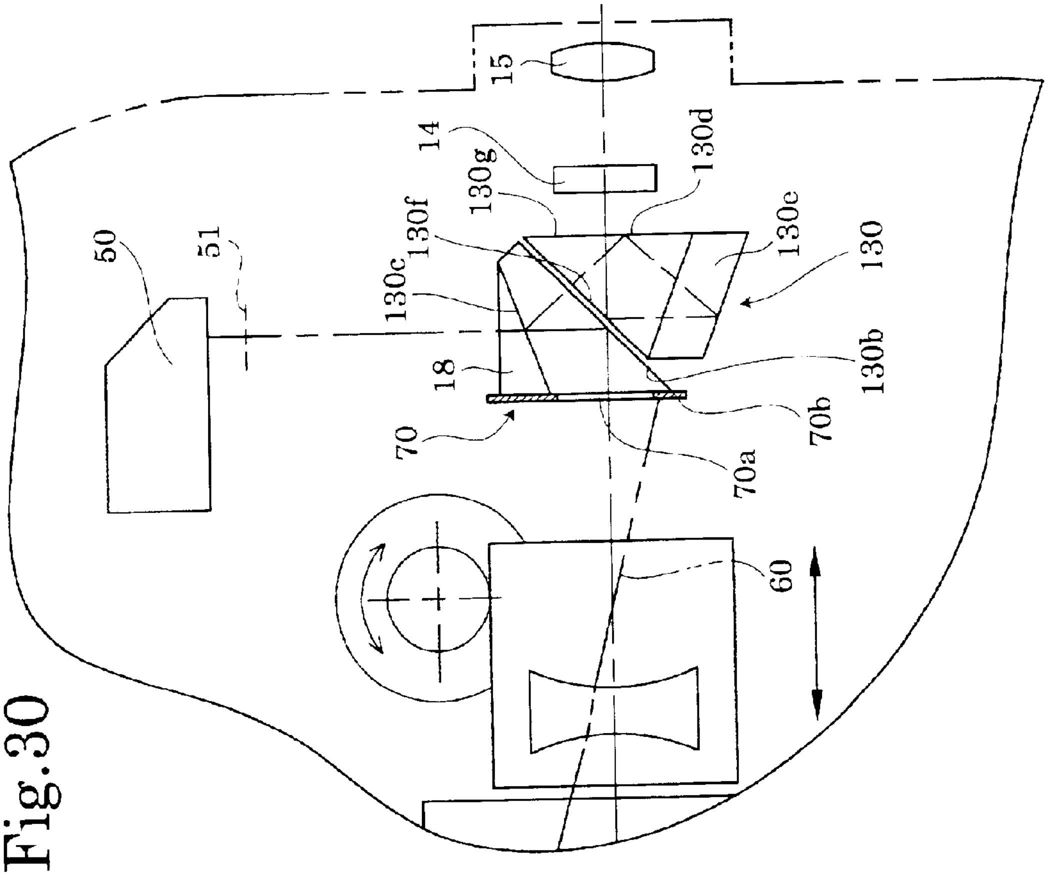
FIG. 30 is a side elevational view of another embodiment of a fundamental portion of the first embodiment of the ghost image formation preventing device shown in FIG. 9, showing the case where the Porro prism shown in FIG. 9 is replaced by the roof prism shown in FIG. 28.
Figure 29:
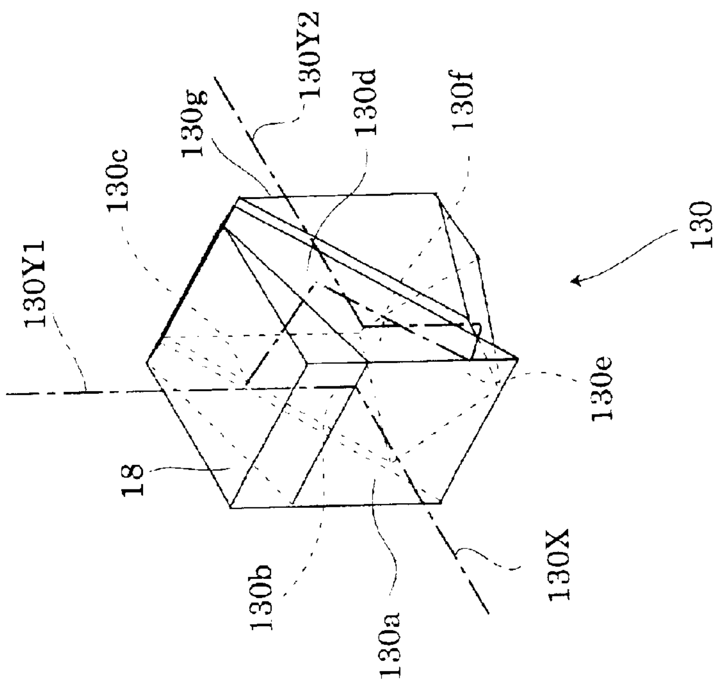
FIG. 29 is a perspective view of an embodiment of a roof prism serving as an erecting optical system which can be replaced with the Porro prism used in each of the first through eighth embodiments of the ghost image formation preventing devices.

Each of the above described first through eighth embodiments of the ghost image formation preventing devices employs the Porro prism 13 as an erecting optical system. FIGS. 29 through 32 show ninth through eleventh embodiments of the ghost image formation preventing device. Each of the ninth through eleventh embodiments employs a Schmidt prism 130, including a roof prism, shown in FIG. 29 as an erecting optical system instead of the Porro prism 13. The Schmidt prism 130 has an incident surface 130*a*, first through fifth reflection surfaces 130*b* through 130*f* and an exit surface 130*g* as shown in FIGS. 29 and 30. The fourth reflection surface is a roof surface. A semitransparent film is formed on the second reflection surface 130*c* so that it serves as a beam splitter. The incident surface 130*a* extends perpendicular to an optical axis 130X. The light incident on the incident surface 130*a* is reflected upwards by the first reflection surface 130*b* at an angle of 90 degrees. Part of the light reflected by the first reflection surface 130*b* is reflected by the second reflection surface 130*c* at an angle of 45 degrees in a direction toward the third reflection surface 130*d* (in a direction oblique and lower rightward as viewed in FIG. 29). The light reflected by the second reflection surface 130*c* is reflected by the third reflection surface 130*d* at an angle of 90 degrees in a direction oblique and lower leftward as viewed in FIG. 29. The light reflected by the third reflection surface 130*d* is reflected by the fourth reflection surface 130*e* at an angle of 90 degrees in a direction toward the fifth reflection surface 130*f* (in a direction oblique and lower rightward as viewed in FIG. 29). The light reflected by the fourth reflection surface 130*e* is reflected by the fifth reflection surface 130*f* at an angle of 90 degrees to exit from the exit surface 130*g* to proceed toward the AF sensor unit 50. The exit surface 130*g* and the third reflection surface 130*d* are defined on the same plane, and extend perpendicular to an optical axis 130Y2. The optical axis 130Y2 is parallel to the optical axis 130X. A specific surface of a beam splitting prism (a right-angle prism) 18 is cemented to the semitransparent film formed on the second reflection surface 130*c*. The light which is reflected by the first reflection surface 130*b* and is subsequently passed through the second reflection surface 130*c* proceeds toward the AF sensor unit 50 along an optical axis 130Y1.

FIG. 30 shows the ninth embodiment of the ghost image formation preventing device. In this embodiment, a light shield plate 70 having an aperture 70*a* and a light shield portion 70*b*, which is similar to the light shield plate 70 shown in FIGS. 9 and 10, is disposed immediately in front of the incident surface 130*a* of the roof prism 130 to prevent the off-field light bundle 60 from entering into the Schmidt prism 130.

Figure 31:
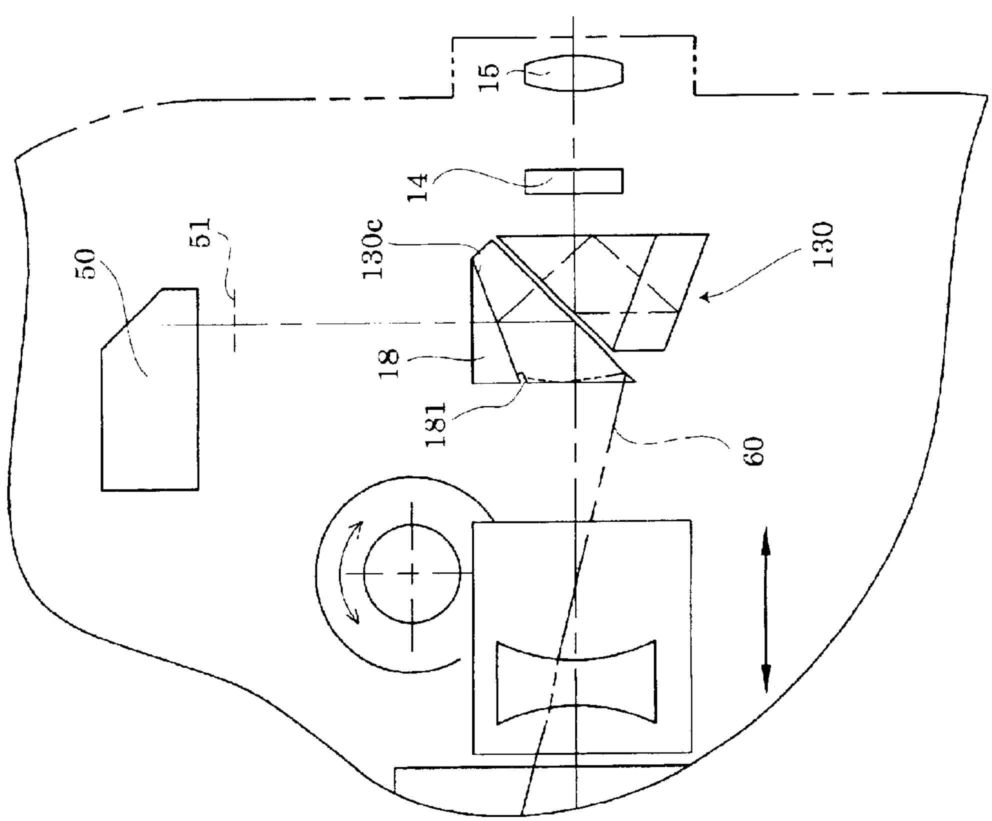
FIG. 31 is a side elevational view of another embodiment of a fundamental portion of the second embodiment of the ghost image formation preventing device shown in FIG. 11, showing the case where the Porro prism shown in FIG. 11 is replaced by the roof prism shown in FIG. 28.

FIG. 31 shows the tenth embodiment of the ghost image formation preventing device. In this embodiment, a recessed portion 181 is provided in the roof prism 130 between the Schmidt prism 130 and the beam splitting prism 18 along an edge therebetween, and is positioned in an optical path of the off-field light bundle 60.

Figure 32:
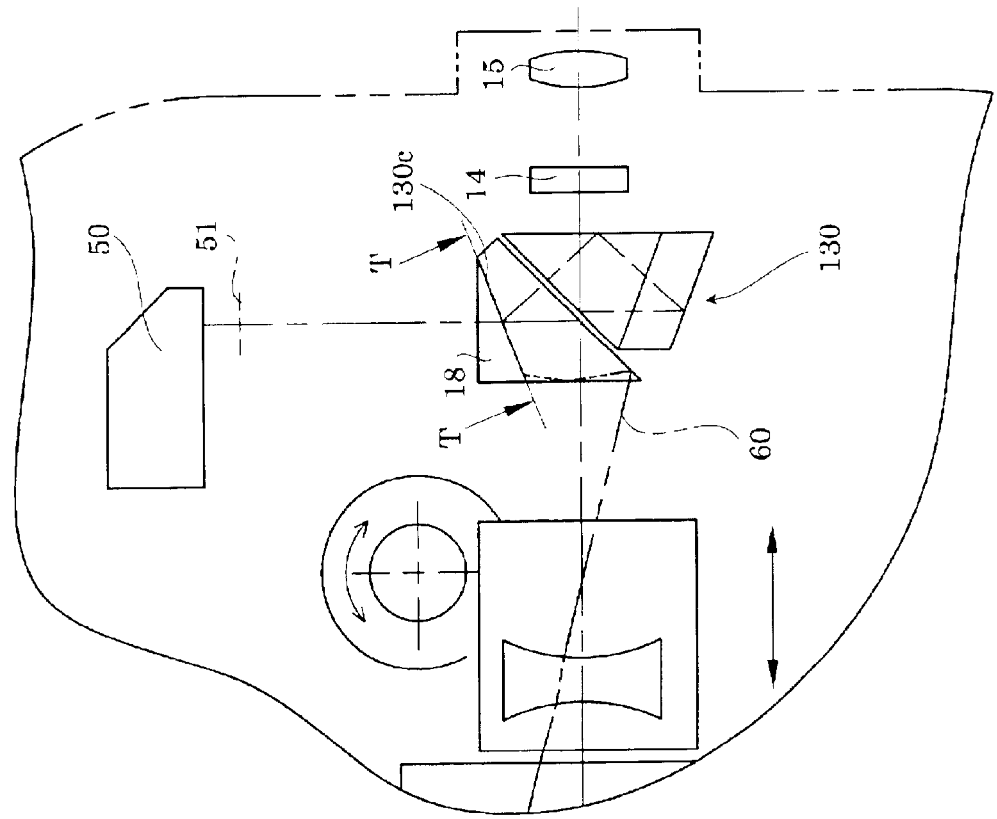
FIG. 32 is a side elevational view of another embodiment of a fundamental portion of the fifth embodiment of the ghost image formation preventing device shown in FIG. 19, showing the case where the Porro prism shown in FIG. 19 is replaced by the roof prism shown in FIG. 28.
Figure 33:
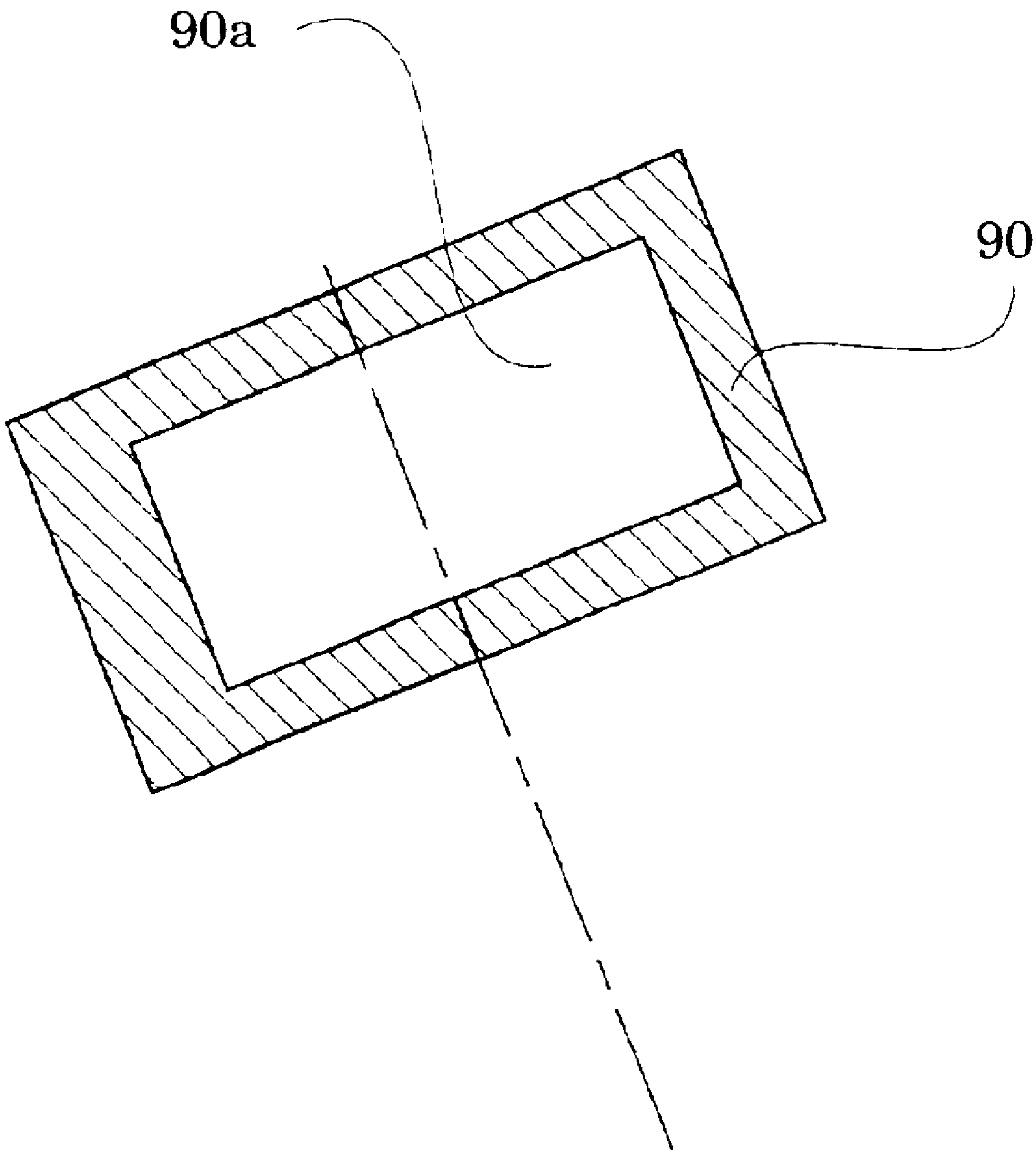
FIG. 33 is a plan view of a light shield mask provided in the roof prism shown in FIG. 32, viewed in the direction of arrows T in FIG. 32.

FIG. 32 shows the eleventh embodiment of the ghost image formation preventing device. In this embodiment, a semitransparent film is formed on the second reflection surface 130*c* so as to serve as a beam splitter. Furthermore, a light shield mask 90 shown in FIG. 33 having the elongated rectangular aperture 90*a*, which is to the same as that in the above described fifth or six embodiment, is fixed to the second reflection surface 130*c* to be positioned between the second reflection surface 130*c* and the incident surface 18*a* of the beam splitting prism 18. In FIG. 33, the hatched portion shows a portion (light interception member) other than the aperture 90*a*.

In each of the ninth through eleventh embodiments of the ghost image formation preventing devices, the off-field light bundle 60 which is incident on the Schmidt prism 130 reaches neither the eyepiece 15 nor the AF sensor unit 50.

In each of the above described first through eleventh embodiments of the ghost image formation preventing devices, although the AF sensor unit 50 is a phase-difference detection type, the AF sensor unit 50 can be replaced with any other type such as a contrast detecting type. The present embodiment of the electronic distance meter can be incorporated in or attached to not only a total station, but also any other surveying instrument having a surveying telescope such as a theodolite. Furthermore, the erecting optical system is not limited to those in the above-described embodiments.

The present embodiment of the electronic distance meter performs a distance measuring operation in a manner such as described in the following description. In the first step, a surveyor (user) aims the sighting telescope 10 at the corner cube prism 17 so that the optical axis X of the sighting telescope 10 is generally in line with the corner cube prism 17, while viewing the corner cube prism 17 through a collimator (not shown) which is attached to the sighting telescope 10. In the second step, the surveyor depresses the AF start switch 44 to perform the aforementioned autofocus operation to move the focusing lens 12 to an in-focus position (in-focus state) thereof relative to the corner cube prism 17. In the third step, in a state where the sighting telescope 10 is in focus relative to the corner cube prism 17, the surveyor adjusts the direction of the sighting telescope 10 so that the reticle (cross hair) 15 viewed through the eyepiece 15 is precisely centered on the corner cube prism 17 while looking into the eyepiece 15. In the fourth step, the surveyor depresses the distance-measurement operation start switch 45 to perform the aforementioned distance-calculating operation, wherein the calculated distance is indicated on the indicating device 42.

As can be understood from the foregoing, according to a ghost image formation preventing device of a surveying instrument to which the present invention is applied, a ghost image is prevented from being formed in the field of the sighting telescope optical system. Furthermore, in the case of the surveying instrument equipped with a focus detecting device, a focus detecting operation can be performed with a high degree of precision.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument comprising:

a sighting telescope having an objective lens and an eyepiece;

an erecting optical system functioning so that an image formed by said objective lens is viewed as an erect image through the eyepiece; and a light shield device, positioned in an optical path extending from an incident surface of said erecting optical system to an exit surface of said erecting optical system, for preventing an off-field light bundle which is incident on said erecting optical system from reaching said eyepiece, wherein said light shield device comprises a light shield mask fixed to said incident surface of said erecting optical system, said light shield mask including an aperture which allows image forming light to pass therethrough, said aperture being shaped so as to be asymmetrical with respect to an optical axis incident on said incident surface of said erecting optical system.

2. The surveying instrument according to claim 1, wherein a first length of said aperture from the incident optical axis to a first side, at which an optical path length between said incident surface and a first reflection surface of said erecting optical system is shortest, is shorter than a second length of said aperture from the incident optical axis to a second side at which an optical path length between said incident surface and said first reflection surface is longest.

3. The surveying instrument according to claim 1, wherein said erecting optical system comprises a Porro prism.

4. The surveying instrument according to claim 3, wherein said Porro prism comprises three right angle prisms.

5. The surveying instrument according to claim 1, wherein said erecting optical system comprises a roof prism.

6. The surveying instrument according to claim 1, wherein said sighting telescope comprises a focus adjustment lens positioned between said objective lens and said erecting optical system.

7. A surveying instrument comprising:

a sighting telescope having an objective lens and an eyepiece;

an erecting optical system functioning so that an image formed by said objective lens is viewed as an erect image through the eyepiece; and a light shield device, positioned in an optical path extending from an incident surface of said erecting optical system to an exit surface of said erecting optical system, for preventing an off-field light bundle which is incident on said erecting optical system from reaching said eyepiece, wherein said erecting optical system comprises two cemented prisms, and wherein said light shield device comprises a recessed portion formed on a common edge of the cemented surface of the two cemented prisms.

8. A surveying instrument comprising:

a sighting telescope having an objective lens and an eyepiece;

an erecting optical system functioning so that an image formed by said objective lens is viewed as an erect image through the eyepiece; and a light shield device, positioned in an optical path extending from an incident surface of said erecting optical system to an exit surface of said erecting optical system, for preventing an off-field light bundle which is incident on said erecting optical system from reaching said eyepiece, wherein said erecting optical system comprises two cemented prisms, and wherein said light shield device comprises a beveled surface formed on a common edge of the cemented surface of the two cemented prisms.

* * * * *